(12) United States Patent
Yamauchi et al.

(10) Patent No.: US 7,604,863 B2
(45) Date of Patent: Oct. 20, 2009

(54) COMPOSITE OF GLASS AND HOT MELT COMPOSITION AND METHOD OF PRODUCING THE SAME

(75) Inventors: Shigeru Yamauchi, Kanagawa (JP); Akihiro Miyata, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 122 days.

(21) Appl. No.: 11/865,154

(22) Filed: Oct. 1, 2007

(65) Prior Publication Data

US 2008/0081194 A1 Apr. 3, 2008

(30) Foreign Application Priority Data

Sep. 29, 2006 (JP) .............................. 2006-267242

(51) Int. Cl.
*B32B 17/10* (2006.01)
*C03C 17/30* (2006.01)
(52) U.S. Cl. .................... 428/415; 428/425.6; 428/429; 65/60.2; 65/60.3
(58) Field of Classification Search ................. None
See application file for complete search history.

(56) References Cited

U.S. PATENT DOCUMENTS

| 6,646,048 B2 | 11/2003 | Matsuda et al. |
| 6,765,055 B2 | 7/2004 | Miyata et al. |
| 2007/0003746 A1* | 1/2007 | Chen et al. .................. 428/220 |

FOREIGN PATENT DOCUMENTS

| JP | 2002-53798 A | 2/2002 |
| JP | 2002-079611 A | 3/2002 |
| JP | 2004-210893 A | 7/2004 |
| WO | WO-01/55267 A1 | 8/2001 |

\* cited by examiner

*Primary Examiner*—Monique R Jackson
(74) *Attorney, Agent, or Firm*—Connolly Bove Lodge & Hutz LLP

(57) ABSTRACT

A composite of glass and hot melt composition including glass; a primer layer formed on the glass using a primer containing a film forming resin and at least one alkoxysilyl group-containing compound selected from the group consisting of isocyanate silane and a reaction product of aminosilane and epoxysilane; and a hot melt layer formed on the primer layer using a hot melt composition containing an aromatic polyester (a), and its production method are provided. The resulting composite of glass and hot melt composition is excellent in water-resistant adhesion to glass.

20 Claims, 2 Drawing Sheets

COMPOSITE OF GLASS AND HOT MELT COMPOSITION AND METHOD OF PRODUCING THE SAME

RELATED APPLICATIONS

This application claims priority to Japanese Application No. 2006-267242 filed Sep. 29, 2006, disclosure of which is incorporated herein by reference.

The entire contents of documents cited in this specification are incorporated herein by reference.

BACKGROUND OF THE INVENTION

The present invention relates to a composite of glass and a hot melt composition, and to a method of producing the same.

Hitherto, moisture-curing urethane adhesives have been used for adhering a molded resin to glass.

For example, in the case of automobiles, moisture-curing urethane adhesives are used for adhering parts, such as a glass positioning pin or a glass holder, to glass.

However, when a resin molded body is adhered to glass using moisture-curing urethane adhesives, it takes a long time until the urethane adhesives are cured, which requires securing space for maturing the adhesives and placing the adhesives in an oven for maturing, resulting in poor productivity.

Moreover, adhering a thermoplastic resin to glass with a primer is proposed in JP 6-206237 A, JP 57-158481 A, JP 8-58362 A, and JP 2-151635 A, for example.

JP 4-246491 A and US 2003/0207986 A each propose a primer used for glass.

JP 9-216995 A, JP 62-74955 A, and JP 2-120347 A each propose a polyester hot melt composition.

The applicant of this application proposes primer compositions in WO 01/55267 and JP 2002-53798 A and a molding resin composition in JP 2004-210893 A.

SUMMARY OF THE INVENTION

In view of the above-mentioned problems, the inventor of the present invention carried out an adhesion test for adhering a hot melt to glass by molding a molten hot melt composition on glass.

The inventor of the present invention examined adhesion of various hot melt compositions to glass in the adhesion test of glass and hot melt, and found that a polyester hot melt composition among the various hot melt compositions is adhered to glass.

However, the inventor of the present invention found that the polyester hot melt composition has poor water-resistant adhesion to glass.

Thus, an object of the present invention is to provide a method of producing a composite of glass and hot melt composition which is excellent in productivity and enables the composite obtained to be excellent in water-resistant adhesion to glass.

Another object of the present invention is to provide a composite of glass and hot melt composition excellent in water-resistant adhesion.

The inventor of the present invention carried out extensive researches for solving the above-mentioned problems, and found that a method of producing a composite of glass and hot melt composition which includes a primer applying step for applying a primer to glass; a melting step for melting a polyester hot melt composition; and an applying or molding step for applying or molding the molten hot melt composition to the glass to which the primer has been applied, to adhere the hot melt composition to the glass thereby obtaining the composite of glass and hot melt composition, is excellent in productivity. The inventor of the present invention also found that this production method enables the resulting composite of glass and hot melt composition to be excellent in water-resistant adhesion.

More specifically, the present invention provides the following methods (1) to (21) of producing a composite of glass and hot melt composition.

The method (1) of producing a composite of glass and hot melt composition is also referred to as the "production method according to a first aspect of the present invention".

(1) A method of producing a composite of glass and hot melt composition comprising:
a primer applying step for applying a primer to glass;
a melting step for melting a polyester hot melt composition; and
an applying and/or molding step for applying and/or molding the molten hot melt composition onto the glass to which the primer has been applied, to adhere the hot melt composition to the glass thereby obtaining the composite of glass and hot melt composition.

(2) The method of producing the composite of glass and hot melt composition according to (1) above, wherein the hot melt composition contains an aromatic polyester (a), a tackifier (b), and a polyol compound (c) having two or more hydroxy groups in one molecule.

(3) The method of producing the composite of glass and hot melt composition according to (2) above, wherein the hot melt composition further contains a polyolefin (d).

(4) The method of producing the composite of glass and hot melt composition according to any one of (1) to (3) above, wherein the primer contains isocyanate silane.

(5) The method of producing the composite of glass and hot melt composition according to (4) above, wherein the primer further contains a film forming resin.

(6) The method of producing the composite of glass and hot melt composition according to (5) above, wherein the film forming resin is a polar resin.

(7) The method of producing the composite of glass and hot melt composition according to (2) above, wherein the aromatic polyester (a) contained in the hot melt composition is polyester obtained by reacting an acid component containing one or both of terephthalic acid and isophthalic acid with a hydroxy group component containing at least one member selected from the group consisting of ethylene glycol, polytetramethylene ether glycol, neopentyl glycol, and 1,4-butanediol.

(8) The method of producing the composite of glass and hot melt composition according to (2) above, in which the aromatic polyester (a) contained in the hot melt composition includes:
polyester A obtained by reacting an acid component containing terephthalic acid and isophthalic acid with a hydroxy group component containing ethylene glycol and neopentyl glycol; and
polyester B obtained by reacting an acid component containing terephthalic acid and isophthalic acid with a hydroxy group component containing 1,4-butanediol and polytetramethylene ether glycol.

(9) The method of producing the composite of glass and hot melt composition according to (7) or (8), wherein the hot melt composition further includes, as the aromatic polyester (a), polyester C obtained by reacting an acid component containing telephthalic acid, isophthalic acid and sebacic acid with a hydroxy group component containing 1,4-butanediol.

(10) The method of producing the composite of glass and hot melt composition according any one of (7) to (9), wherein the hot melt composition further includes, as the aromatic polyester (a), polyester D obtained by reacting an acid component containing telephthalic acid, isophthalic acid and ε-caprolactone with a hydroxy group component containing 1,4-butanediol.

(11) The method of producing the composite of glass and hot melt composition according to (2) above, wherein the tackifier (b) is a rosin tackifier.

(12) The method of producing the composite of glass and hot melt composition according to (11) above, wherein the rosin tackifier is rosin diol.

(13) The method of producing the composite of glass and hot melt composition according to (3) above, wherein the polyolefin (d) contains at least one member selected from the group consisting of an epoxy group, a carboxy group, and an acid anhydride group.

(14) The method of producing the composite of glass and hot melt composition according to (3) above, wherein the polyolefin (d) contains an epoxy group and one or both of a carboxy group and an acid anhydride group.

(15) The method of producing the composite of glass and hot melt composition according to (13) or (14) above, wherein the carboxy group is a carboxy group derived from maleic acid and the acid anhydride group is a maleic anhydride group.

(16) The method of producing the composite of glass and hot melt composition according to (2) above, wherein the amount of the tackifier (b) is 1 to 50 parts by weight with respect to 100 parts by weight of the aromatic polyester (a).

(17) The method of producing the composite of glass and hot melt composition according to (3) above, wherein the amount of the tackifier (b) is 1 to 50 parts by weight with respect to 100 parts by weight of the total of the aromatic polyester (a) and the polyolefin (d).

(18) The method of producing the composite of glass and hot melt composition according to (2) above, wherein the content of the polyol compound (c) is 0.5 to 50 parts by weight with respect to 100 parts by weight of the aromatic polyester (a).

(19) The method of producing the composite of glass and hot melt composition according to (3) above, wherein the content of the polyol compound (c) is 0.5 to 50 parts by weight with respect to 100 parts by weight of the total of the aromatic polyester (a) and the polyolefin (d).

(20) The method of producing the composite of glass and hot melt composition according to (3) above, wherein the amount of the polyolefin (d) is 5 to 40 parts by weight with respect to 100 parts by weight of the total of the aromatic polyester (a) and the polyolefin (d).

(21) The method of producing the composite of glass and hot melt composition according to (1) above, wherein the hot melt composition has a viscosity at 190° C. of 10 to 5,000 Pa·s.

The inventor of the present invention discovered that a composite of glass and hot melt composition including glass; a primer layer formed on the glass using a primer containing a film forming resin and at least one alkoxysilyl group-containing compound selected from the group consisting of isocyanate silane and a reaction product of aminosilane and epoxysilane; and a hot melt layer formed on the primer layer using a hot melt composition containing an aromatic polyester (a) had an excellent water-resistant adhesion.

The inventor of the present invention also found that a method of producing the composite of glass and hot melt composition which includes a primer applying step for applying to glass a primer containing a film forming resin and at least one alkoxysilyl group-containing compound selected from the group consisting of isocyanate silane and a reaction product of aminosilane and epoxysilane; a melting step for melting a hot melt composition containing an aromatic polyester (a); and an applying and/or molding step for applying and/or molding the molten hot melt composition onto the glass to which the primer has been applied, to adhere the hot melt composition to the glass thereby obtaining the composite of glass and hot melt composition, is excellent in productivity and enables the composite of glass and hot melt composition obtained to be excellent in water-resistant adhesion. The present invention has been accomplished based on such finding.

The method of producing the composite of glass and hot melt composition of the present invention is excellent in productivity, and the method of producing the composite of glass and hot melt composition of the present invention enables the composite of glass and hot melt composition obtained to be excellent in water-resistant adhesion.

The composite of glass and hot melt composition of the invention is excellent in water resistant adhesion.

BRIEF DESCRIPTION OF THE DRAWINGS

In the accompanying drawings.

DETAILED DESCRIPTION OF THE PREFERRED EMBODIMENTS

Figure 1:
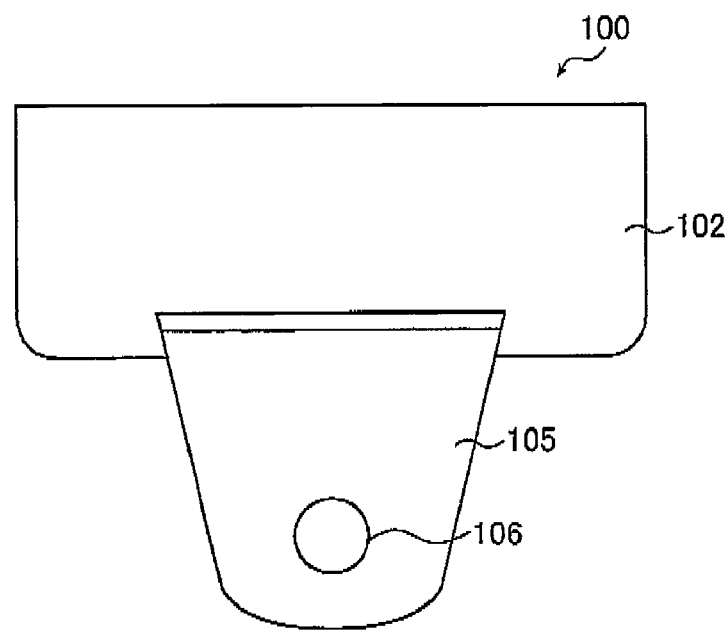
FIG. 1 is a front view schematically illustrating an example of a glass holder.

Hereinafter, the present invention will be described in more detail.

The present invention provides a method of producing a composite of glass and hot melt composition including:

a primer applying step involving applying a primer to glass;

a melting step involving melting a polyester hot melt composition; and an applying and/or molding step involving applying and/or molding the molten hot melt composition onto the glass to which the primer has been applied, to adhere the hot melt composition to the glass thereby obtaining the composite of glass and hot melt composition.

The applying step will be described below.

The applying step is a step involving applying a primer to glass.

In the applying step, glass treated with the primer is used.

In the applying step, the primer is used to form a primer layer.

Any glass can be used without particular limitation in the primer applying step. For example, conventionally known glass is used.

For example, the dimension and material of the glass can be selected according to the intended use, as exemplified by glass for use in automobiles.

The primer will be described below.

There is no particular limitation on the primer used in the primer applying step insofar as the primer can be used for glass.

The primer may contain isocyanate silane, for example.

It is preferable for the primer to contain isocyanate silane from the viewpoint of more excellent water-resistant adhesion to glass.

There is no particular limitation on the isocyanate silane which may be contained in the primer insofar as it is an isocyanate group-containing silane coupling agent. Illustrative examples of the isocyanate silane include aromatic isocyanate silanes obtained by adding at least one polyisocyanate compound selected from the group consisting of addition products of 1,1,1-trimethylolpropane (TMP) and tolylene diisocyanate (TDI) and addition products of TMP and xylylene diisocyanate (XDI) to at least one silane compound selected from the group consisting of N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and 3-(n-propylamino)propyltrimethoxysilane; and aliphatic isocyanate silanes such as isocyanate propyltrimethoxysilane and isocyanate propyltriethoxysilane.

Of those, aliphatic isocyanate silanes are preferable from the viewpoint of more excellent water-resistant adhesion to glass.

Such isocyanate silanes may be used alone or in combination of two or more.

For example, at least one alkoxysilyl group-containing compound selected from the group consisting of isocyanate silane and a reaction product of aminosilane and epoxysilane is used for the silane compound contained in the primer.

The alkoxysilyl group-containing compound is an alkoxysilyl group-containing isocyanate compound or a reaction product of aminosilane and epoxysilane which has an alkoxysilyl group.

The alkoxysilyl group is not particularly limited as far as it is a group in which one to three alkoxy groups bind to silicon atom.

Exemplary alkoxy groups include methoxy group, ethoxy group, and propoxy group.

When one or two alkoxy groups bind to a silicon atom, examples of the group which may bind to the silicon atom in addition to the alkoxy groups include alkyl groups such as methyl group and ethyl group.

Examples of the alkoxysilyl group include trimethoxysilyl group, triethoxysilyl group, dimethoxymethylsilyl group, dimethoxyethylsilyl group, diethoxymethylsilyl group, and diethoxyethylsilyl group.

The alkoxysilyl group is preferably trimethoxysilyl group or methyldimethoxysilyl group from the viewpoints of excellent adhesion to glass or metal, and more excellent water-resistant adhesion.

There is no particular limitation on the isocyanate silane which may be contained in the primer insofar as it is an isocyanate group-containing silane coupling agent.

Exemplary isocyanate silanes include those having at least one isocyanate group and at least one alkoxysilyl group in one molecule, and more specifically, those in which at least one isocyanate group and at least one alkoxysilyl group are bonded to a hydrocarbon group having one or more carbon atoms.

For example, at least one member selected from the group consisting of aliphatic hydrocarbon groups, alicyclic hydrocarbon groups, unsaturated aliphatic hydrocarbon groups, and aromatic hydrocarbon groups may be used for the hydrocarbon group. Moreover, the hydrocarbon group may have a urethane bond, a urea bond, or a thiourethane bond, for example.

Such isocyanate silanes may be represented, for example, by the following formula (1):

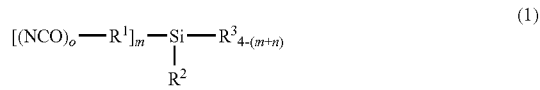

where $R^1$ is a hydrocarbon group that may contain at least one bond selected from the group consisting of urethane bond, urea bond, and thiourethane bond, $R^2$ is an alkoxy group, $R^3$ is an alkyl group, m is an integer of 1 to 3, n is an integer of 1 to 3, o is an integer of 1 to 3, and m+n is an integer of 2 to 4.

The hydrocarbon group that may contain at least one bond selected from the group consisting of urethane bond, urea bond, and thiourethane bond preferably contains 1 to 8 carbon atoms. Examples of the hydrocarbon group include aliphatic hydrocarbon groups such as methylene group, ethylene group, trimethylene group, tetramethylene group, pentamethylene group, hexamethylene group, heptyl group, and octyl group; and aromatic hydrocarbon groups such as phenylene group and xylylene group.

The hydrocarbon group can contain an aromatic hydrocarbon group such as phenyl group, as a side chain.

Examples of the aliphatic isocyanate silane in which $R^1$ only contains carbon atom and hydrogen atom include isocyanatopropyltrimethoxysilane, isocyanatopropyltriethoxysilane, isocyanatopropylmethyldimethoxysilane, and isocyanatopropylmethyldiethoxysilane.

The hydrocarbon group may contain a urethane bond as described above, and a urethane bond derived from a urethane prepolymer may be used.

Examples of the urethane prepolymer that may form a urethane bond-containing hydrocarbon group include those obtained from 1,1,1-trimethylolpropane (TMP) and at least one member selected from the group consisting of tolylene diisocyanate (TDI), xylylene diisocyanate (XDI) and hexamethylene diisocyanate (HDI).

Illustrative examples of the isocyanate silane which may be contained in the primer include aromatic isocyanate silanes obtained by adding at least one polyisocyanate compound (urethane prepolymer) selected from the group consisting of addition products of 1,1,1-trimethylolpropane (TMP) and tolylene diisocyanate (TDI) and addition products of TMP and xylylene diisocyanate (XDI) to at least one aminosilane compound selected from the group consisting of N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and 3-(n-propylamino) propyltrimethoxysilane.

Use may also be made of an aliphatic isocyanate silane obtained by reacting an aliphatic urethane prepolymer such as an addition product of TMP and hexamethylene diisocyanate (HDI), HDI biuret, HDI isocyanurate, or HDI-TDI isocyanurate with a compound having an active hydrogen group capable of reacting with an isocyanate group and an alkoxysilyl group (e.g., aminosilane such as 3-(N-phenyl)aminopropyltrimethoxysilane, mercaptosilane).

Of those, an aliphatic isocyanate silane is preferable from the viewpoint of more excellent water-resistant adhesion to glass.

The aliphatic isocyanate silane is a compound in which an isocyanate group and an alkoxysilyl group are bonded to an aliphatic hydrocarbon group.

Moreover, from the viewpoint of more excellent water-resistant adhesion to glass, a reaction product of an aliphatic urethane prepolymer, an aliphatic biuret, HDI isocyanurate or HDI-TDI isocyanurate with a compound having an active hydrogen group capable of reacting with an isocyanate group and an alkoxysilyl group is preferable, and a reaction product of an addition product (urethane prepolymer) of TMP and hexamethylene diisocyanate (HDI), HDI biuret, HDI isocyanurate, or HDI-TDI isocyanurate with 3-(N-phenylpropyl)trimethoxysilane or 3-mercaptopropyltrimethoxysilane is more preferable.

There is no particular limitation on the process of producing the isocyanate silane. For example, any conventionally known process is used.

In the case of the isocyanate silane in which at least one isocyanate group and at least one alkoxysilyl group are bonded to a hydrocarbon group having, for example, a urethane bond, an urea bond, or a thiourethane bond, the isocyanate silane is produced by a process which involves reacting a polyisocyanate having two or more isocyanate groups with a compound having an active hydrogen group capable of reacting with an isocyanate group and an alkoxysilyl group in such an amount that the ratio of isocyanate group to active hydrogen group is 2.0 or higher.

There is no particular limitation on the polyisocyanate used in producing the isocyanate silane insofar as it is a compound in which two or more isocyanate groups are bonded. Examples of the polyisocyanate include an aliphatic polyisocyanate, an aromatic polyisocyantate, and a urethane prepolymer.

Of those, an aliphatic polyisocyanate and a urethane prepolymer obtained from an aliphatic polyisocyanate are preferable from the viewpoint of more excellent water-resistant adhesion to glass.

The aliphatic polyisocyanate is a compound in which two or more isocyanate groups are bonded to an aliphatic hydrocarbon group. The aliphatic hydrocarbon group preferably contains 3 to 12 carbon atoms from the viewpoint of excellent adhesion to adherends.

Examples of the aliphatic polyisocyanate include chain aliphatic polyisocyanates such as hexamethylene diisocyanate; alicyclic polyisocyanates such as isophorone diisocyanate, hydrogenated xylylene diisocyanate, and hydrogenated dicyclohexylmethane diisocyanate; and aralkyl polyisocyanates such as xylylene diisocyanate.

With respect to the urethane prepolymer obtained from the aliphatic polyisocyanate, the aliphatic polyisocyanate for use in producing the urethane prepolymer is not particularly limited, and, for example, those mentioned above may be used.

Moreover, with respect to the urethane prepolymer obtained from the aliphatic polyisocyanate, the polyol for use in producing the urethane prepolymex is not particularly limited, and, for example, trimethylolpropane, polyoxypropylene glycol, and polyoxypropylene triol may be used.

There is no particular limitation on the process of producing the urethane prepolymer obtained from the aliphatic polyisocyanate. For example, any conventionally known process is used.

From the viewpoint of more excellent water-resistant adhesion to glass, the polyisocyanate for use in producing the isocyanate silane is preferably a urethane prepolymer obtained from a polyisocyanate in which an isocyanate group is bonded to a chain aliphatic hydrocarbon group or an aliphatic polyisocyanate in which an isocyanate group is bonded to a chain hydrocarbon group, and more preferably a urethane prepolymer obtained from hexamethylene diisocyanate, hydrogenated xylylene diisocyanate, xylylene diisocyanate, or aliphatic polyisocyanate.

The polyisocyanate for use in producing the isocyanate silane preferably has 2 to 4 functional isocyanate groups from the viewpoint of more excellent water-resistant adhesion of a primer.

Such polyisocyanates may be used alone or in combination of two or more.

In the compound having an active hydrogen group capable of reacting with an isocyanate group and an alkoxysilyl group, examples of the active hydrogen group capable of reacting with an isocyanate group include amino group, mercapto group, and hydroxy group.

Of those, amino group and mercapto group are preferable from the viewpoint of excellent adhesion to adherends.

In the compound having an active hydrogen group capable of reacting with an isocyanate group and an alkoxysilyl group, there is no particular limitation on the alkoxysilyl group. Examples of the alkoxysilyl group include trimethoxysilyl group, triethoxysilyl group, dimethoxymethylsilyl group, dimethoxyethylsilyl group, diethyoxymethylsilyl group, and diethoxyethylsilyl group.

In the compound having an active hydrogen group capable of reacting with an isocyanate group and an alkoxysilyl group, there is no limitation on the organic group to which the active hydrogen group capable of reacting with an isocyanate group and the alkoxysilyl group are bonded. For example, at least one member selected from the group consisting of an aliphatic hydrocarbon group, an alicyclic hydrocarbon group, and an aromatic hydrocarbon group may be used therefor.

Examples of the compound having an amino group as the active hydrogen group capable of reacting with an isocyanate group and an alkoxysilyl group include those containing a secondary amine such as N,N-bis[(3-trimethoxysilyl)propyl]amine, N,N-bis[(3-triethoxysilyl)propyl]amine, N,N-bis[3-tripropoxysilyl]propyl]amine, 3-(n-butylamino)propyltrimethoxysilane, 3-(n-propylamino)propyltrimethoxysilane, and N-phenyl-γ-aminopropyltrimethoxysilane.

Of those, from the viewpoint of more excellent water-resistant adhesion, a compound containing a secondary amine is preferable, and N-phenyl-γ-aminopropyltrimethoxysilane and N-butyl-γ-aminopropyltrimethoxysilane are more preferable.

Examples of the compound having a mercapto group as the active hydrogen group capable of reacting with an isocyanate group and an alkoxysilyl group include γ-mercaptopropyltrimethoxysilane, γ-mercaptopropyltriethoxysilane, γ-mercaptopropylmethyldimethoxysilane, γ-mercaptopropylmethyldiethoxysilane, and γ-mercaptopropylethyldiethoxysilane.

Such compounds having an active hydrogen group capable of reacting with an isocyanate group and an alkoxysilyl group may be used alone or in combination of two or more.

From the viewpoint of more excellent water-resistant adhesion, a polyisocyanate having two or more isocyanate groups is preferably reacted with a compound having an active hydrogen group capable of reacting with an isocyanate group and an alkoxysilyl group at a ratio of isocyanate group/active hydrogen group of at least 2.0, and more preferably 2.0 to 4.0.

Such isocyanate silanes may be used alone or in combination of two or more.

The reaction product of aminosilane and epoxysilane (hereinafter also referred to as "amino/epoxysilane reaction product") will be described below.

There is no particular limitation on the process of producing the amino/epoxysilane reaction product insofar as it is obtained by reacting aminosilane with epoxysilane. For example, conventionally known amino/epoxysilane reaction products may be used.

A specific example includes a reaction product obtained by reacting aminosilane having two or more amino groups in one molecule with epoxysilane having an epoxy group.

There is no particular limitation on the aminosilane for use in producing the amino/epoxysilane reaction product insofar as it is an amine silane coupling agent having an amino group and an alkoxysilyl group.

Exemplary amino groups that may be contained in the aminosilane include primary amino group (—NH$_2$) and secondary amino group (—NH—). The aminosilane can contain —NH$_2$ and —NH— in one molecule, for example.

From the viewpoint of excellent adhesion to a hot melt composition and more excellent water-resistant adhesion, the aminosilane preferably has two or more amino groups, and more preferably two amino groups.

It is particularly desirable for the aminosilane to contain a primary amino group and a secondary amino group.

There is no particular limitation on the alkoxysilyl group used. For example, those mentioned above may be used.

There is no particular limitation on the aminosilane for use in producing the amino/epoxysilane reaction product insofar as at least one amino group and at least one alkoxysilyl group are bonded to a hydrocarbon group having one or more carbon atoms.

The hydrocarbon group may contain —NH— in the skeleton.

Examples of the aminosilane used in producing the amino/epoxysilane reaction product include N-(β-aminoethyl)-γ-aminopropyltrimethoxysilane, N-(β-aminoethyl)-γ-aminopropylmethyldimethoxysilane, N-(β-aminoethyl)-aminomethyltrimethoxysilane, N-(β-aminoethyl)-γ-aminopropyltriethoxysilane, and N-(β-aminoethyl)-γ-aminopropylethyldiethoxysilane.

Of those, from the viewpoints of excellent adhesion to a hot melt composition and more excellent water-resistant adhesion, a compound containing a primary amino group and a secondary amino group is preferred, and N-(β-aminoethyl)-γ-aminopropyltrimethoxysilane, N-(β-aminoethyl)-γ-aminopropylmethyldimethoxysilane and N-(β-aminoethyl)-γ-aminomethyltrimethoxysilane are more preferred.

Such aminosilanes may be used alone or in combination of two or more.

There is no particular limitation on the epoxysilane for use in producing the amino/epoxysilane reaction product insofar as it is an epoxy silane coupling agent having an epoxy group and an alkoxysilyl group.

The alkoxysilyl group contained in the epoxysilane is not particularly limited, and, for example, those mentioned above may be used.

Of those, trimethoxysilyl group and methyldimethoxysilyl group are preferable from the viewpoint of excellent adhesion to glass or metal.

There is no particular limitation on the epoxysilane for use in producing the amino/epoxysilane reaction product insofar as at least one epoxy group and at least one alkoxysilyl group are bonded to a hydrocarbon group having one or more carbon atoms.

The hydrocarbon group may contain, for example, an ether bond in the skeleton.

From the viewpoint of more excellent water-resistant adhesion, the epoxysilane preferably has one epoxy group.

Examples of the epoxysilane used in producing the amino/epoxysilane reaction product include dialkoxyepoxysilanes such as γ-glycidoxypropylmethyldimethoxysilane, γ-glycidoxypropyldimethylethoxysilane, γ-glycidoxypropylmethyldiethoxysilane, and β-(3,4-epoxycyclohexyl)ethylmethyldimethoxysilane; and trialkoxyepoxysilanes such as γ-glycidoxypropyltrimethoxysilane, β-(3,4-epoxycyclohexyl)ethyltrimethoxysilane.

Of those, from the viewpoints of excellent adhesion to glass or metal and more excellent water-resistant adhesion, γ-glycidoxypropyltrimethoxysilane and γ-glycidoxypropylmethyldimethoxysilane are preferred.

Such epoxysilanes may be used alone or in combination of two or more.

From the viewpoints of excellent adhesion to glass or metal and to a hot melt composition and more excellent water-resistant adhesion, reaction products of γ-glycidoxypropyltrimetoxysilane and/or γ-glycidoxypropylmethyldimethoxysilane with N-(β-aminoethyl)-γ-aminopropyltrimethoxysilane are preferable amino/epoxysilane reaction products.

Such amino/epoxysilane reaction products may be represented, for example, by the following formula (2):

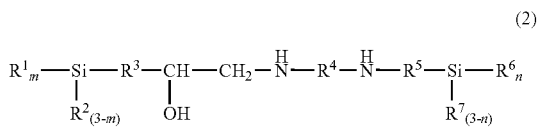

where $R^1$ and $R^6$ each independently represent an alkoxy group, $R^2$ and $R^7$ each independently represent an aliphatic hydrocarbon group having 1 to 3 carbon atoms, $R^3$ represents a chain aliphatic hydrocarbon group or an alicyclic hydrocarbon group which has 2 to 6 carbon atoms and may have oxygen atom, $R^4$ represents an aliphatic hydrocarbon group or an aromatic hydrocarbon group having 2 to 4 carbon atoms, $R^5$ represents a chain aliphatic hydrocarbon group having 2 to 6 carbon atoms, and m and n each independently represent an integer of 1 to 3.

Examples of the compound represented by the formula (2) include:

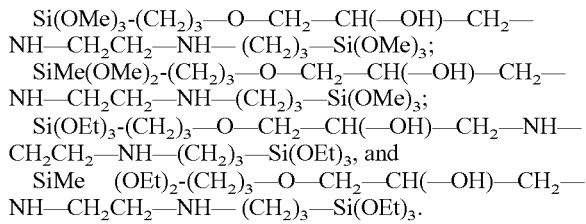

The amino/epoxysilane reaction product preferably contains three or more alkoxy groups which are bonded to silicon atom from the viewpoints of excellent adhesion to glass or metal and more excellent water-resistant adhesion.

Such alkoxy group-containing compounds may be used alone or in combination of two or more.

In producing the amino/epoxysilane reaction product, the amount of epoxysilane is preferably 1.0 to 2.5 mol, and more preferably 1.0 to 2.3 mol per mole of aminosilane from the viewpoint of excellent adhesion to glass and a hot melt composition.

The primer preferably further contains a film forming resin from the viewpoint of excellent adhesion strength with respect to glass.

There is no particular limitation on the film forming component to be contained in the primer insofar as it is resin having film forming properties.

An exemplary film forming resin includes a polar resin.

The polar resin is a preferable film forming resin from the viewpoint of excellent adhesion to glass or metal.

Any polar resin is used without particular limitation insofar as it is a resin having a polar group.

Examples of the polar group include carbonate group, ester linkage, nitrile group, urethane group, amide linkage, carboxy group, acrylate group, methacrylate group, acetal linkage, hydroxy group, amino group, imino group, and epoxy group.

Examples of the polar resin include a polycarbonate resin, a polyester resin, an ABS resin, a polyurethane resin, a polyamide resin, a polyethylene terephthalate resin, an acrylic resin, a polyalkyl acrylate resin, a polyalkyl methacrylate resin, a polyacetal resin, a polyvinyl chloride resin, a polyvinylidene chloride resin, and an epoxy resin.

Of those, a polyester resin, a polyurethane resin, a polyamide resin, an acrylic resin, and an epoxy resin are preferable from the viewpoint of excellent adhesion to glass or metal.

As the polar resin, a polyester resin, a polyurethane resin, an acrylic resin, and an epoxy resin are preferable polar resins from the viewpoints of more excellent water-resistant adhesion and excellent hot water-resistant adhesion.

Such film forming resins may be used alone or in combination of two or more.

The amount of film forming resin is preferably 1 to 500 parts by weight based on 100 parts by weight of isocyanate silane from the viewpoint of excellent adhesion to glass or metal.

The amount of film forming resin is preferably 1 to 500 parts by weight, and more preferably 50 to 300 parts by weight based on 100 parts by weight of alkoxysilyl group-containing compound from the viewpoint of excellent adhesion to glass or metal.

The primer may contain a solvent and an additive in amounts that do not adversely affect the merits of the present invention.

Examples of the solvent include aromatic hydrocarbon compounds such as benzene, xylene, and toluene; ketones such as acetone, methyl ethyl ketone, and methyl isobutyl ketone; esters such as methyl acetate, ethyl acetate, and butyl acetate; and ethers such as diethyl ether, tetrahydrofuran, and dioxane.

Examples of the additive include a corrosion inhibitor, a plasticizer, a filler, a thickener, an antioxidant, an inorganic pigment, an organic pigment, a UV absorber, a desiccant, and a thixotropic agent.

There is no particular limitation on the process of producing the primer. For example, the primer can be obtained by mixing isocyanate silane and a film forming resin. The primer can also be obtained by mixing a film forming resin and at least one alkoxysilyl group-containing compound selected from the group consisting of isocyanate silane and a reaction product of aminosilane and epoxysilane.

In the primer applying step, there is no particular limitation on the method of applying the primer to glass, and, for example, brush coating, spray coating, and dip coating may be used.

The primer layer can be formed by optionally drying the solvent after the primer has been applied.

After application of the primer, the glass treated with the primer can be used in the applying or molding step immediately after the application. The glass treated with the primer may also be used in the applying or molding step after 72 hours or more have passed from the application.

The melting step will be described below. The melting step involves melting a polyester hot melt composition.

The hot melt composition will be described below.

The hot melt composition used in the present invention is a polyester hot melt composition.

The hot melt composition contains polyester as a base polymer.

There is no particular limitation on the polyester contained in the hot melt composition. Illustrative polyesters include an aromatic polyester and a fatty acid polyester.

The aromatic polyester is a preferable example.

From the viewpoints of more excellent water-resistant adhesion and excellent hot water-resistant adhesion, the aromatic polyester is a preferable polyester.

Hereinafter, the aromatic polyester contained in the hot melt composition is referred to as the aromatic polyester (a).

The aromatic polyester (a) is not particularly limited, and any conventionally known aromatic polyester may be used.

An aromatic polyester obtained by the condensation reaction of an aromatic polycarboxylic acid and a glycol is particularly preferable.

A specific example of the aromatic polyester (a) includes an aromatic polyester containing a polyester obtained by reacting an acid component containing one or both of terephthalic acid and isophthalic acid with a hydroxy group component containing at least one member selected from the group consisting of ethylene glycol (hereinafter, abbreviated as EG), polytetramethylene ether glycol (hereinafter, abbreviated as PTMG), neopentyl glycol (hereinafter, abbreviated as NPG), and 1,4-butanediol (hereinafter, abbreviated as 1,4-BD).

More specific examples include the following polyesters A to D.

In the present invention, polyester A refers to a polyester obtained by carrying out a condensation reaction using a mixture of terephthalic acid and isophthalic acid for the acid component and using a mixture of NPG and EG for the hydroxy group component.

The viscosity at 190° C. of the polyester A is preferably 0.5 to 2 Pa·s, and more preferably 0.7 to 1.5 Pa·s.

In the present invention, polyester B refers to a polyester obtained by carrying out a condensation reaction using a mixture of terephthalic acid and isophthalic acid for the acid component and using a mixture of PTMG and 1,4-BO for the hydroxy group component.

The melt index (hereinafter abbreviated as MI) which is a measure showing the flowability of the molten polyester B is preferably 10 or higher, and more preferably 13 to 50, at 200° C. It is preferable for the MI of the polyester B to be within this range because the viscosity at the time of molding is maintained low and the heat resistance after molding is excellent.

PTMG is not particularly limited insofar as it is a polymer obtained by polymerizing 1,4-BD. The number average molecular weight is preferably 2,000 or higher. H-283 commercially available from Mitsubishi Chemical Corporation can be used.

In the present invention, polyester C refers to a polyester obtained by carrying out a condensation reaction using a mixture of terephthalic acid, isophthalic acid, and sebacic acid for the acid component and using 1,4-BD for the hydroxy group component.

The viscosity at 190° C. of the polyester C is preferably 200 to 700 Pa·s, and more preferably 400 to 600 Pa·s.

In the present invention, polyester D refers to a polyester obtained by carrying out a condensation reaction using a mixture of terephthalic acid, isophthalic acid, and ε-caprolactone for the acid component and using 1,4-BD for the hydroxy group component.

The viscosity at 190° C. of the polyester D is preferably 100 to 300 Pa·s, and more preferably 150 to 200 Pa·s.

It is preferable for the aromatic polyester (a) to contain at least two members selected from the group consisting of the polyesters A, B, C, and D, and it is more preferable for the aromatic polyester (a) to contain the polyesters A and B.

This is because incorporation of the polyester B which is excellent in flexibility, heat resistance, chemical resistance, oil resistance and ductility and the polyester A which has a low viscosity and is excellent in moldability enables the hot melt composition at the time of molding to be maintained at a low viscosity while imparting flexibility to a solidified material after molding and also ensures more excellent productivity.

From the viewpoints of more excellent water-resistant adhesion and excellent hot water-resistant adhesion, it is preferable for the aromatic polyester (a) to contain at least two members selected from the group consisting of the polyesters A, B, C and D, and it is more preferable for the aromatic polyester (a) to contain the polyesters A and B.

For the same reason as described above, it is preferable for the aromatic polyester (a) to contain the polyesters A and B, and one or both of the polyesters C and D.

The contents of the polyesters A, B, C, and D in the aromatic polyester (a) are preferably 10 to 50 wt %, 10 to 50 wt %, 0 to 30 wt %, and 0 to 30 wt %, respectively with respect to the total weight of the aromatic polyester (a). The aromatic polyester (a) more preferably contains 25 to 45 wt % of the polyester A, 20 to 40 wt % of the polyester B, 0 to 20 wt % of the polyester C, and 0 to 25 wt % of the polyester D, and still more preferably 30 to 40 wt % of the polyester A, 25 to 35 wt % of the polyester B, 0 to 15 wt % of the polyester C, and 0 to 20 wt % of the polyester D.

It is preferable for the contents of the polyesters A, B, C and D to be within the above ranges to achieve more excellent productivity, to enable the flexibility to be imparted to a solidified material after molding while maintaining the hot melt composition at the time of molding at a low viscosity, and to impart excellent oil resistance and gasoline resistance to the solidified material after molding. Furthermore, the contents mentioned above are also preferable because the curing time after molding is reduced and maturing is not required.

The contents of the polyesters A, B, C, and D in the aromatic polyester (a) are preferably 10 to 50 wt %, 10 to 50 wt %, 0.1 to 30 wt %, and 0.1 to 30 wt %, respectively with respect to the total weight of the aromatic polyester (a). The aromatic polyester (a) more preferably contains 25 to 45 wt % of the polyester A, 20 to 40 wt % of the polyester B, 0.1 to 20 wt % of the polyester C, and 0.1 to 25 wt % of the polyester D, and still more preferably 30 to 40 wt % of the polyester A, 25 to 35 wt % of the polyester B, 0.1 to 15 wt % of the polyester C, and 0.1 to 20 wt % of the polyester D.

It is preferable for the contents of the polyesters A, B, C and D to be within the above ranges to achieve more excellent productivity, to enable the flexibility to be imparted to a solidified material after molding while maintaining the hot melt composition at the time of molding at a low viscosity, and to impart excellent oil resistance and gasoline resistance to the solidified material after molding. Furthermore, the contents mentioned above are also preferable because the curing time after molding is reduced and maturing is not required.

The hot melt composition used in the present invention is excellent in thermal shock resistance and can follow expansion/contraction of the adherend during the heat cycle.

The hot melt composition used in the present invention can contain a tackifier (b).

It is preferable for the hot melt composition to contain the tackifier (b) from the viewpoints of more excellent water-resistant adhesion and excellent hot water-resistant adhesion and also considering that the primer is less likely to be peeled from glass even when the hot melt composition is used at high temperatures.

There is no particular limitation on the tackifier (b) insofar as it can be used for the hot melt composition. For example, any conventionally known tackifiers can be used and, specific examples thereof include rosin tackifiers, terpene tackifiers, and petroleum resin tackifiers.

Examples of the rosin tackifier include an ester of rosin acid which includes abietic acid contained in colophony and pine oil as a main component with glycerin or pentaerythritol, and hydrogenated or disproportionated products thereof. Specific examples thereof include a gum rosin, a tall oil rosin, a wood rosin, a hydrogenated rosin, a disproportionated rosin, a polymerized rosin, a modified rosin, and a rosin diol.

The rosin tackifier is preferably rosin diol from the viewpoint of excellent hot water-resistant adhesion.

Exemplary rosin diols include those having groups represented by the following formulae (3) to (5). In the formula (4), n is an integer of 1 or more.

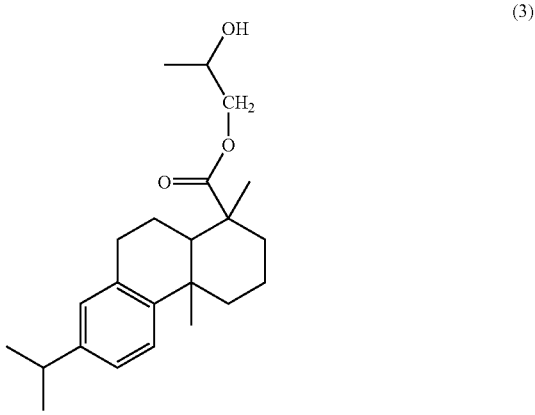

(3)

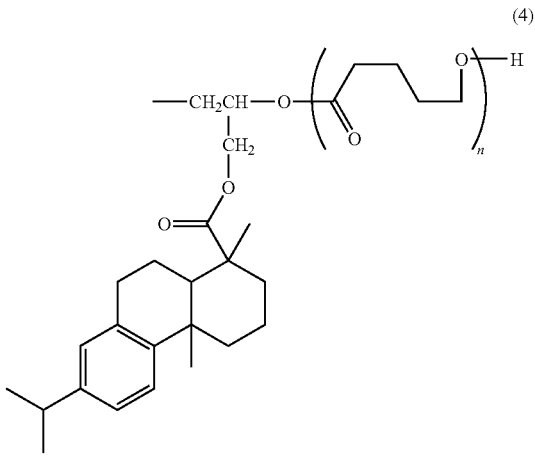

(4)

(5)

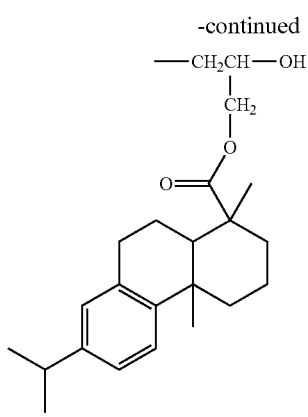
—CH₂CH—OH
  |
  CH₂
  |
  O
  |
  C=O
  (attached to structure)

Examples of the terpene tackifier include those obtained by polymerizing terpene oil contained in a pine tree or natural terpene contained in orange peel. Specific examples thereof include a terpene resin, an aromatic-modified terpene resin, a terpene-phenol resin, and a hydrogenated terpene resin.

Examples of the petroleum resin tackifier include an aliphatic resin, an alicyclic resin, and an aromatic resin which use petroleum as a starting material. Specific examples thereof include a $C_5$ petroleum resin, a $C_9$ petroleum resin, a copolymerized petroleum resin, an alicyclic saturated hydrocarbon resin, and a styrene petroleum resin.

Of those, the rosin tackifier is preferable and rosin diol is more preferable, considering that the viscosity of the hot melt composition is reduced, resulting in ease of molding, and that excellent ductility, more excellent hot water-resistant adhesion to glass, excellent balance between heat resistance and flexibility, and excellent gasoline resistance can be achieved.

Use may be made of commercially available rosin diols such as PINECRYSTAL D-6011, KE-615-3, or D-6240 (all of which are manufactured by Arakawa Chemical Industries, Ltd.).

PINECRYSTAL PC-D-6011 is a compound represented by the following formula (6); PINECRYSTAL PC-D-615-3 is a compound represented by the following formula (7); and PINECRYSTAL PC-D-6240 is a compound represented by the following formula (8).

In the formula (6), the portion shown by the wavy line where two groups represented by the formula (3) are bound to each other is a divalent organic group. The same applies to the formula (7).

In the formula (7), n each independently represents an integer of 1 or more.

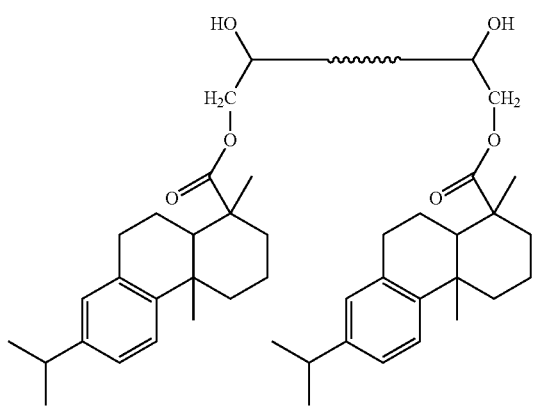
(6)

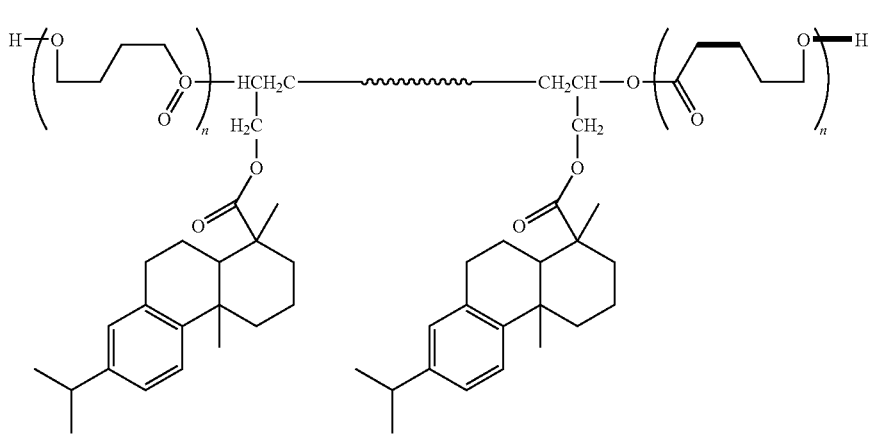
(7)

-continued

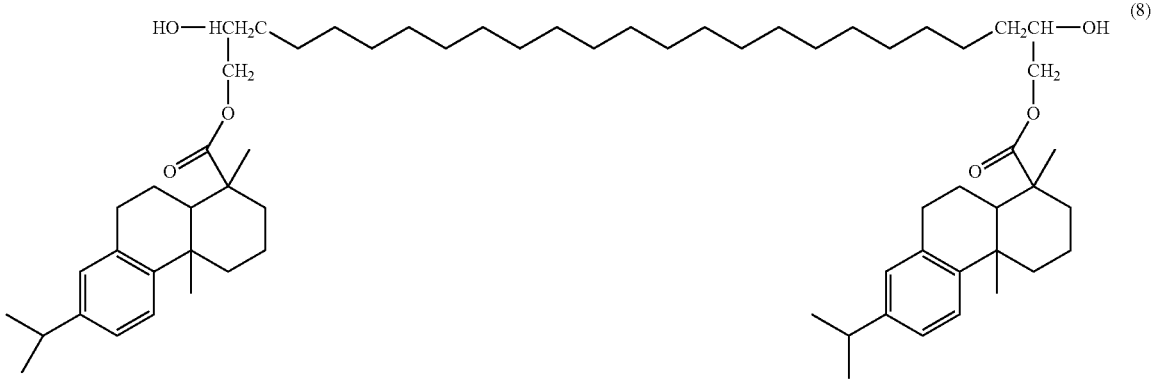
(8)

Such tackifiers (b) may be used alone or in combination of two or more.

The amount of the tackifier (b) is preferably 1 to 50 parts by weight, and more preferably 10 to 40 parts by weight based on 100 parts by weight of the aromatic polyester (a). When the amount of the tackifier (b) is within such range, excellent ductility of the hot melt composition, more excellent water-resistant adhesion to glass, favorable balance between heat resistance and flexibility, and favorable gasoline resistance are achieved.

When the hot melt composition contains a polyolefin (d) described below, the amount of the tackifier (b) is preferably 1 to 50 parts by weight, and more preferably 10 to 40 parts by weight based on 100 parts by weight of the total of the aromatic polyester (a) and the polyolefin (d). When the amount of the tackifier (d) is within such range, excellent ductility of the hot melt composition, more excellent water-resistant adhesion to glass, favorable balance between heat resistance and flexibility, and favorable gasoline resistance are achieved.

The hot melt composition may further contain a polyol compound (c).

It is preferable for the hot melt composition to further contain the polyol compound (c), considering that the primer is less likely to be peeled from glass even when the hot melt composition is used at high temperatures, and from the viewpoints of more excellent water-resistant adhesion and excellent hot water-resistant adhesion to glass.

There is no particular limitation on the polyol compound (c), insofar as the polyol compound has two or more hydroxy groups in one molecule, and serves as a compatibilizer that makes the aromatic polyester (a) compatible with the tackifier (b).

Specific examples of the polyol compound (c) include ethylene glycol, propylene glycol, butanediol, polycarbonate polyol, polycaprolactone, diethylene glycol, glycerine, hexanetriol, trimethylolpropane, and pentaerythritol; polyether polyols such as polytetramethylene ether glycol, polyethylene glycol, polypropylene glycol, polyoxypropylene diol, polyoxypropylene triol, and polyoxybutylene glycol; polyolefin polyols such as polybutadiene polyol and polyisoprene glycol; an adipate polyol; a lactone polyol; polyalcohols such as polyesterd polyol (e.g., castor oil); and polyphenols such as resorcin and bisphenol.

It is particularly preferable to use polycarbonate polyol (e.g., polycarbonate diol) and polycaprolactone because they exhibit the effects of the compatibilizer even when used in small amounts.

Polycarbonate diol is preferable, considering that a cured product to be obtained is excellent in resistance to high humidity and high temperature.

The average molecular weight of the polyol compound (c) is preferably 500 to 10,000, more preferably 1,000 to 10,000, and still more preferably 2,000 to 10,000.

Such polyol compounds (c) may be used alone or in combination of two or more.

The amount of the polyol compound (c) is preferably 0.5 to 50 parts by weight, more preferably 1 to 20 parts by weight, and still more preferably 2 to 10 parts by weight based on 100 parts by weight of the aromatic polyester (a). When the amount of the polyol compound (c) is within such range, the aromatic polyester (a) and the tackifier (b) are made sufficiently compatible with each other while keeping the physical properties (heat resistance, flexibility, gasoline resistance) of polyester from lowering.

When the hot melt composition contains the polyolefin (d) described below, the amount of the polyol compound (c) is preferably 0.5 to 50 parts by weight, more preferably 1 to 20 parts by weight, and still more preferably 2 to 10 parts by weight based on 100 parts by weight of the total of the aromatic polyester (a) and the polyolefin (d). When the amount of the polyol compound (c) is within such range, the aromatic polyester (a) and the tackifier (b) are made sufficiently compatible with each other while keeping the physical properties (heat resistance, flexibility, gasoline resistance) of polyester from lowering.

According to one preferable aspect of the present invention, the hot melt composition contains the aromatic polyester (a), the tackifier (b), and the polyol compound (c).

In such a case, because of the presence of the tackifier (b) and the polyol compound (c), the hot melt composition achieves excellent ductility, more excellent water-resistant adhesion to glass, and favorable balance between heat resistance and flexibility while preventing separation of the aromatic polyester (a) from the tackifier (b) that may occur during melting.

This is presumably because addition of the polyol compound (c) would cause the tackifier (b) to be preferentially taken into the amorphous portion of the aromatic polyester (a).

Oil resistance and in particular gasoline resistance which would be reduced in the case where the tackifier (b) is singly added to the hot melt composition are improved.

In the present invention, it is preferable for the hot melt composition to further contain the polyolefin (d), considering that the primer is less likely to be peeled from glass even when the hot melt composition is used at high temperatures and that more excellent water-resistant adhesion to glass, excellent hot water-resistant adhesion, and excellent adhesion to olefin can be achieved.

The polyolefin (d) is not particularly limited. Illustrative examples include polyolefin resins made of homopolymers of α-olefins such as ethylene, propylene, butylene, pentene, and 4-methyl-1-pentene; copolymers of two or more such α-olefins; or copolymers of such α-olefins with other copolymerizable monomers.

Such polyolefins (d) may be used alone or in combination of two or more.

Polyethylene is particularly preferable from the viewpoint of excellent gasoline resistance.

Polypropylene is preferable from the viewpoint of more excellent water-resistant adhesion to glass.

According to one preferable aspect, the polyolefin (d) contains a polar group.

In general, polyolefin has a low polarity, whereas the aromatic polyester (a) has a high polarity. Thus, when the hot melt composition is left in a molten state for a long period of time during or after the production of the hot melt composition, the aromatic polyester (a) and the polyolefin (d) are separated from each other, and, when stirred again, cannot be sufficiently mixed with each other, which may reduce the adhesion.

In contrast, when the polyolefin (d) has a polar group, the aromatic polyester (a) and the polyolefin (d) are not separated from each other even after the hot melt composition has been melted for a long period of time, and the adhesion therebetween can be maintained.

There is no particular limitation on the polar group the polyolefin (d) may contain. Specific examples of the polar group include epoxy group, carboxy group, acid anhydride group, amino group, isocyanate group, hydroxy group, nitro group, and sulfone group.

Such polar groups may be used alone or in combination of two or more.

From the viewpoint of excellent adhesion to the polyolefin (d) having a polar group, it is preferable to use as the polar group at least one member selected from the group consisting of epoxy group, carboxy group, and acid anhydride group, and epoxy group is more preferably used.

From the viewpoint of excellent adhesion to glass, it is preferable to use as the polar group at least one member selected from the group consisting of epoxy group, carboxy group, and acid anhydride group, and epoxy group is more preferably used.

According to one preferable aspect, epoxy group is bonded to methylene group (i.e., glycidyl group).

It is preferable for the polyolefin (d) to contain epoxy group and one or both of carboxy group and acid anhydride group.

It is preferable that the carboxy group be derived from maleic acid and that the acid anhydride group be maleic anhydride group.

Polyolefin having a polar group can be obtained by, for example, a method involving copolymerizing an olefin and a polar group-containing polymerizable monomer (e.g., glycidyl methacrylate). A commercially available polyolefin may also be used.

The amount of the polyolefin (d) is preferably 5 to 40 parts by weight, more preferably 10 to 40 parts by weight, and still more preferably 20 to 40 parts by weight based on 100 parts by weight of the total of the aromatic polyester (a) and the polyolefin (d).

When the amount of the polyolefin (d) is within such range, more excellent productivity, more excellent water-resistant adhesion to glass, and excellent gasoline resistance are achieved.

The hot melt composition may optionally contain various additives such as a reinforcing agent, an antiaging agent, an antioxidant, a filler, a plasticizer, a thermal stabilizer, a UV absorber, a lubricant, a wax, a colorant, a crystallization accelerator, and a reinforcing fiber as long as the merits of the invention are not impaired.

There is no particular limitation on the process of producing the hot melt composition. The hot melt composition can be produced by mixing the aromatic polyester (a), the tackifier (b), the polyol compound (c), and optionally the polyolefin (d) and additives, using a roll mill, a kneader, an extruder, or a universal stirrer, for example.

In the melting process, the hot melt composition is melted preferably at 160 to 230° C., and more preferably at 180 to 210° C.

In the melting process, there is no limitation on the device used for melting the hot melt composition. For example, a hot melt applicator, a single screw extruder, a twin screw extruder may be used.

From the viewpoints of excellent coatability and moldability, the viscosity at 190° C. as measured with a B-type viscometer is preferably 10 to 5,000 Pa·s, and more preferably 10 to 100 Pa·s.

The hot melt composition can be used, for example, to adhere it to glass and olefin (e.g., olefin electric wire).

The applying or molding step will be described below.

In the applying or molding step, a molten hot melt composition is applied or molded onto glass to which the primer has been applied, to adhere the glass to the hot melt composition to thereby obtain a composite of glass and hot melt composition.

In the applying or molding step, the hot melt composition forms a hot melt layer.

There is no particular limitation on the method of applying or molding the hot melt composition. For example, a hot melt gun, a hot melt applicator, a mold, a single screw extruder, a twin screw extruder, an injection molding machine can be used.

When the hot melt composition is applied or molded (by, for example, injection molding, discharge molding, or potting), the pressure at which the hot melt composition is discharged from a discharge port into a mold is preferably less than 5 Mpa, more preferably 0.2 to 1.0 MPa, and still more preferably 0.3 to 0.5 MPa.

The application or molding is preferably performed at a temperature ranging from 120 to 230° C., and more preferably from 180 to 210° C. It is preferable for the temperature to fall within such range because the stability of the hot melt composition used for molding is improved, and the viscosity of the hot melt composition at the time of melting falls within the above-defined range.

In the applying and/or molding step, the molten hot melt composition is applied and/or molded onto glass to adhere the glass to the hot melt composition, thereby obtaining a composite of hot melt composition and glass.

In the applying and molding step, the molten hot melt composition is applied to glass to form an adhesive layer, and the hot melt composition is molded onto the adhesive layer to adhere the hot melt composition to the glass, thereby obtaining a composite of hot melt composition and glass.

When the hot melt composition is applied onto the glass, the hot melt composition (hot melt layer) is used as, for example, an adhesive; an adhesive layer is formed with the hot melt composition; and another member (e.g., a glass holder, a positioning pin, a sealing member for a junction portion of a terminal of electronic equipment) is incorporated in the adhesive layer to thereby obtain a composite.

In addition, when the hot melt composition is molded onto the glass, the hot melt composition (hot melt layer) serves as another member (e.g., a glass holder, a positioning pin, a sealing member for a junction portion of a terminal of electronic equipment) to thereby obtain a composite.

Alternatively, the hot melt composition is applied to the glass as an adhesive to form an adhesive layer, the hot melt composition is molded onto the adhesive layer to form a separate member, and the glass is integrated with the member formed by using the hot melt composition to obtain a composite.

When a mold is used, the composite of glass and hot melt composition can be obtained by taking the composite of glass and hot melt composition out of the mold after the completion of the applying or molding step.

The composite may be cooled to room temperature within the mold or be allowed to cool after having been taken out of the mold.

The composite of glass and hot melt composition preferably has an initial adhesion strength as measured by the evaluation method described in Examples of at least 50 N/20 mm, and more preferably at least 100 N/20 mm.

According to the evaluation method in Examples, the composite of glass and hot melt composition after having been allowed to stand in water at 20° C. for one week preferably has a water-resistant adhesion strength of at least 50 N/20 mm, and more preferably at least 100 N/20 mm.

According to the evaluation method in Examples, the composite of glass and hot melt composition after having been allowed to stand in water at 40° C. for one week preferably has a hot water-resistant adhesion strength of at least 50 N/20 mm, and more preferably at least 100 N/20 mm.

The production method of the present invention uses the hot melt composition to achieve excellent productivity. The composite obtained by the production method of the present invention is excellent in water-resistant adhesion to glass, hot water-resistant adhesion, gasoline resistance, ductility, and flexibility; has a low viscosity; and is also excellent in moldability. When the hot melt composition contains a polar group-containing polyolefin as the polyolefin (d), even after the hot melt composition is melted for a long period of time, the aromatic polyester (a) and the polyolefin (d) are not separated from each other to enable the adhesion therebetween to be maintained.

In the case where a moisture-curing urethane composition is used to adhere a molded resin to glass, a curing time of about 30 to 60 minutes has conventionally been required to cure a urethane adhesive.

In contrast, according to the production method of the present invention, the hot melt composition having been applied or molded onto glass is cured by natural cooling within several seconds to several tens of seconds, and the complex can be taken out of the mold within several minutes. Therefore, the inventive method is preferable.

To be specific, according to the production method of the present invention, injection of the molten hot melt composition is completed in 10 seconds, and the complex can be taken out of the mold within one minute in the case of natural cooling. Therefore, the inventive method is preferable.

Furthermore, the production method of the present invention causes no deformation of the complex taken out of the mold, requires no maturing and hence no space for maturing, and achieves excellent productivity.

Examples of the composite obtained by the production method of the present invention include a composite of glass and a glass holder, a composite of glass and a positioning pin, a sealed junction portion of any of various glasses with a terminal of electronic equipment (e.g., sealing body in which the end of a heating wire disposed within an automobile window glass for antifogging is sealed).

A composite of glass and a glass holder will be described below by way of example with reference to the accompanying drawings.

FIG. 1 is a front view schematically illustrating an example of a glass holder 100.

Figure 2:
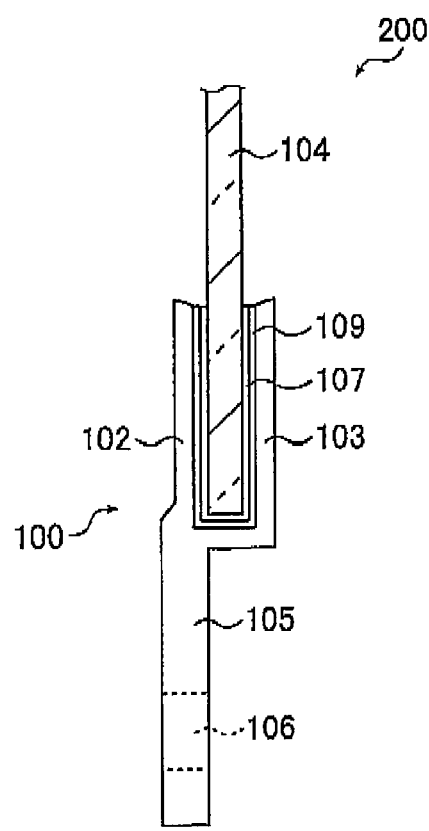
FIG. 2 is a side view schematically illustrating the glass holder adhering to an automobile window glass.

FIG. 2 is a side view schematically illustrating the glass holder 100 adhering to an automobile window glass 104.

In FIG. 1, the glass holder 100 has portions 102 and 103 (hereinafter referred to as "adhering portions 102 and 103" and the adhering portion 103 is not shown in FIG. 1) in which the glass holder 100 is adhered to an automobile window glass (not shown) and which usually have a width of 5 to 10 cm; and a portion 105 (hereinafter referred to as a "connecting portion 105") which extends from a lower end (not shown) of the adhering portion 102 and in which the glass holder is connected to a lifting device (not shown). The connecting portion 105 has a screw hole through which the glass holder is connected to the lifting device (not shown).

In FIG. 2, the glass holder 100 has the adhering portions 102 and 103 which form an approximately U-shape, and the automobile window glass 104 is placed between the adhering portions 102 and 103. The automobile window glass 104 (which usually has a width of about 50 to 80 cm) has a primer 107 at portions contacting the adhering portions 102 and 103, and is adhered to the glass holder 100 with a hot melt composition 109 between the adhering portions 102 and 103, thereby forming a composite 200 of the automobile window glass 104 and the glass holder 100.

Two or more glass holders 100 can be disposed at one side of the automobile window glass 104.

An example of a method of producing the composite 200 will be described below.

First, the primer 107 is applied, for example, to at least a part of the glass 104 at which the glass holder 100 is disposed, in the primer applying step of the method of producing the composite 200.

A hot melt composition is melted in the melting step.

Then, in the applying and/or molding step, a mold capable of molding the glass holder 100 shown in FIG. 1 is prepared, the glass 104 is set in this mold, the molten hot melt composition is applied to at least a part of the glass 104 to which the primer has been applied and molded, thereby obtaining the composite 200 of the glass 104 and the glass holder 100.

After molding, the composite 200 can be taken out of the mold and cooled to room temperature.

The obtained composite 200 can be incorporated into an automobile immediately after molding.

The production method of the present invention is excellent in productivity, and the production method of the present invention can provide a composite of glass and hot melt composition which is excellent in water-resistant adhesion to glass, hot water-resistant adhesion, moldability, and gasoline resistance.

The composite of glass and hot melt composition obtained by the production method of the present invention can prevent invasion of water, hot water, oil, gasoline, and other substances.

Next, the composite of glass and hot melt composition of the present invention will be described below.

The composite of glass and hot melt composition of the present invention has:

glass;

a primer layer formed on the glass using a primer which contains a film forming resin and at least one alkoxysilyl group-containing compound selected from the group consisting of isocyanate silane and a reaction product of aminosilane with epoxysilane; and a hot melt layer formed on the primer layer using a hot melt composition containing an aromatic polyester (a).

Hereinafter, the composite of glass and hot melt composition of the present invention will be often referred to as the "composite of the present invention".

The glass, primer, and hot melt composition which are used for the composite of the present invention are as defined for the production method according to the first aspect of the present invention.

The hot melt composition containing the aromatic polyester (a) is excellent in water resistance and oil resistance.

It is preferable for the hot melt composition used for the composite of the present invention to further contain a tackifier (b) and a polyol compound (c) having two or more hydroxy groups in one molecule from the viewpoint of more excellent water-resistant adhesion.

The tackifier (b) and the polyol compound (c) having two or more hydroxy groups in one molecule are as defined for the production method according to the first aspect of the present invention.

It is preferable for the hot melt composition used for the composite of the present invention to further contain a polyolefin (d) from the viewpoint of more excellent water-resistant adhesion.

The polyolefin (d) is as defined for the production method according to the first aspect of the present invention.

From the viewpoint of excellent adhesion to glass or metal, the film forming resin contained in the primer that may be used for the composite of the present invention is preferably a polar resin.

The polar resin is as defined for the production method according to the first aspect of the present invention.

Moreover, the film forming resin is preferably at least one member selected from the group consisting of a polyurethane resin, a polyester resin, an epoxy resin, and an acrylic resin from the viewpoints of excellent adhesion to glass or metal and more excellent water-resistant adhesion.

The hot melt layer provided in the composite of the present invention is preferably used as an adhesive layer, a glass holder, a positioning pin, or a sealed junction portion of a terminal of electronic equipment.

A specific example is as shown in FIGS. 1 and 2. The composite of the present invention is not limited to the one shown in the attached drawings.

The composite of the present invention is not particularly limited in its production method.

An exemplary method of producing the composite of glass and hot melt composition includes:

a primer applying step for applying to glass a primer containing a film forming resin and at least one alkoxysilyl group-containing compound selected from the group consisting of isocyanate silane and a reaction product of aminosilane and epoxysilane;

a melting step for melting a hot melt composition containing an aromatic polyester (a); and an applying or molding step for applying or molding the molten hot melt composition onto the glass to which the primer has been applied, to adhere the hot melt composition to the glass thereby obtaining the composite of glass and hot melt composition.

Hereinafter, the method of producing the composite of the present invention is also referred to as the "production method according to a second aspect of the present invention".

Each step in the production method according to the second aspect of the present invention is the same as the production method according to the first aspect of the present invention.

The primer which is used in the primer applying step and contains a film forming resin, and at least one alkoxysilyl group-containing compound selected from the group consisting of isocyanate silane and a reaction product of aminosilane and epoxysilane is as defined for the production method according to the first aspect of the present invention.

Moreover, the aromatic polyester (a)-containing hot melt composition which is used in the production method according to the second aspect of the present invention is as defined for the production method according to the first aspect of the present invention.

Conventionally, a molded resin has been adhered to glass using moisture-curing urethane adhesives.

However, in this case, it takes a long time until the urethane adhesives are cured, which requires securing space for maturing the adhesives and placing the adhesives in an oven for maturing, resulting in poor productivity.

In view of such problems, the inventor of the present invention has conceived adhering the hot melt composition to glass.

In general, the hot melt composition is melted and molded to resin and metal members to be used for adhering. Since the hot melt composition has been employed without using a primer for resin adhering, there has been the necessity of examining whether the hot melt composition is adhered to glass when applied to the glass.

As a result of the researches, the inventor of the present invention found that a polyolefin hot melt composition is not adhered to glass at all.

The inventor also found that in the case where a primer is applied to glass for adhering the polyolefin hot melt composition to the glass, then the polyolefin hot melt is melted and molded on the glass surface at temperatures close to 200° C., the primer is peeled from the glass.

Next, the inventor of the present invention found that a polyester hot melt composition is adhered to glass.

However, the inventor of the present invention also found that when adhered to glass, the polyester hot melt composition is poor in water-resistant adhesion to the glass.

Thus, the inventor of the present invention applied the primer to glass, then molded a molten polyester hot melt composition thereto, and surprisingly found that the primer is not peeled from the glass, unlike the case of using the polyolefin hot melt composition, in spite of the arrangement that the primer is coated with the polyester hot melt composition at a high temperature (of about 200° C.), and also found that the water-resistant adhesion is higher than that achieved when no primer is used.

Furthermore, the inventor of the present invention found that when the polyester hot melt composition further contains the tackifier (b), the polyol compound (c), and the polyolefin (d), excellent hot water-resistant adhesion is achieved.

According to the present invention, the polyester hot melt composition can prevent adhesion of the primer from being lost and secure the adhesion of the primer to the glass when the primer is coated with the hot melt composition at a high temperature.

It may be assumed that, when also containing the tackifier (b), the polyol compound (c), and the polyolefin (d), the hot melt composition can further prevent adhesion of the primer from being lost and secure the adhesion of the primer to the glass to achieve excellent hot water-resistant adhesion.

Moreover, the inventor of the present invention found that the primer containing a film forming resin and at least one alkoxysilyl group-containing compound selected from the group consisting of isocyanate silane and a reaction product of aminosilane and epoxysilane is particularly excellent in the balance of adhesion to both glass and the hot melt composition containing the aromatic polyester (a).

More specifically, when the primer contains at least one alkoxysilyl group-containing compound selected from the group consisting of isocyanate silane and a reaction product of aminosilane and epoxysilane, it is considered that the primer has excellent wettability, i.e., affinity, to both glass and the hot melt composition, and, as a result, the composite of the present invention is excellent in the total balance of adhesion.

Moreover, when the primer contains at least one alkoxysilyl group-containing compound selected from the group consisting of isocyanate silane and a reaction product of aminosilane and epoxysilane, the adhesion rate at which the primer is adhered to the hot melt composition and the adhesion rate at which the primer is adhered to the glass are equivalent. Thus, the primer is equally adhered to the glass and the hot melt composition, and a favorable balance of adhesion is maintained. Thus, the composite of the present invention is presumably excellent in the total balance of adhesion.

Conventionally, the inventor of the present invention believed that since the reactivity of a reaction product of aminosilane and epoxysilane with aromatic polyester was low, the primer containing the reaction product of aminosilane and epoxysilane had no adhesion to the hot melt composition containing the aromatic polyester.

However, the inventor of the present invention found that the reaction product of aminosilane and epoxysilane had not only adhesion but also water-resistant adhesion and hot water-resistant adhesion to the hot melt composition containing the aromatic polyester.

When the primer contains the reaction product of aminosilane and epoxysilane, the reactivity between the reaction product of aminosilane and epoxysilane and the aromatic polyester (a) in the hot melt composition is low. Therefore, the adhesion rate at which the primer is adhered to the hot melt composition and the adhesion rate at which the primer is adhered to glass are equivalent, the primer is equally adhered to the glass and the hot melt composition, and a favorable balance of adhesion is maintained. Thus, the composite of the present invention is presumably excellent in the total balance of adhesion.

The above-mentioned mechanism is based on the inference of the inventor of the present invention, and a different mechanism is also applied without departing from the scope of the present invention.

EXAMPLES

Hereinafter, the present invention will be specifically described with reference to Examples and Comparative Examples. However, the present invention is not limited thereto.

1. Polyesters 1 to 4

For the aromatic polyester (a) contained in the hot melt composition for use in the production method of the present invention, ELITEL UE3320 manufactured by Unitika, Ltd. was used as polyester 1; Hytrel 4057 manufactured by DuPont-Toray Co. Ltd. was used as polyester 2; ELITEL UE3410 manufactured by Unitika, Ltd. was used as polyester 3; and ELITEL UE3800 manufactured by Unitika, Ltd. was used as polyester 4. The acid components and glycol components used in manufacturing polyesters 1 to 4, and the molar ratios thereof are shown in the following Table 1.

TABLE 1

|  | Polyester 1 | Polyester 2 | Polyester 3 | Polyester 4 |
|---|---|---|---|---|
| Terephthalic acid | 1.0 | 1.0 | 1.0 | 1.0 |
| Isophthalic acid | 0.16 | 0.46 | 0.25 | 0.1 |
| NPG | 1.0 | — | — | — |
| EG | 0.9 | — | — | — |
| 1,4-BD | — | 1.0 | 0.7 | 0.7 |
| PTMG | — | 0.34 | — | — |
| Sebacic acid | — | — | 0.6 | — |
| ε-caprolactone | — | — | — | 0.1 |

(Values showing molar ratios)

2. Examples 1 to 3 and Comparative Examples 1 to 5

Components shown in the following Table 2 were mixed in proportions (part by weight) shown in Table 2 using a kneader, thereby obtaining hot melt compositions.

The obtained hot melt compositions were used for examining the adhesion to glass. The results are shown in the following Table 2.

3. Manufacture of Sample for Glass Adhesion Test

Manufacture of a sample for a glass adhesion test will be described below with reference to the attached drawing.

Figure 3:
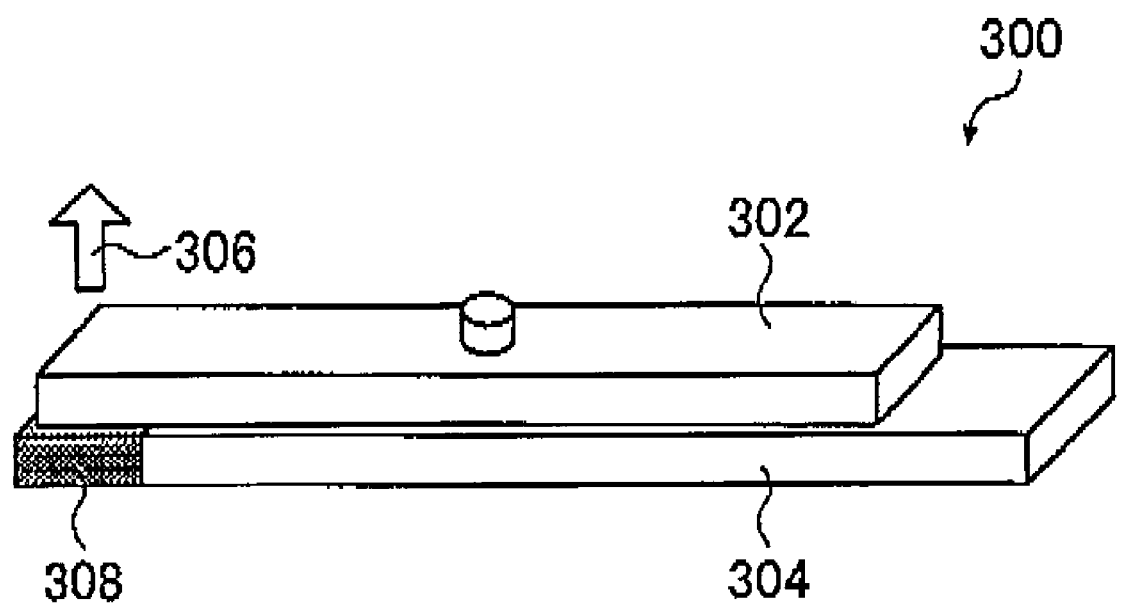
FIG. 3 is a perspective view schematically illustrating an example of a composite of glass and hot melt composition.

FIG. 3 is a perspective view schematically illustrating an example of a composite of glass and hot melt composition.

First, in the applying step, a primer (not shown) shown in Table 2 was applied to glass 304 of 120 mm in length, 25 mm in width, and 3 mm in thickness (trade name: Float Glass, manufactured by Paltec Test Panels Co., Ltd.) using a brush. A mold release tape 308 was adhered to the edge (not shown) of the glass 304 after applying the primer, which was defined as a holding tab (not shown).

Subsequently, in the melting step, the hot melt composition was melted at 200° C. (not shown). The viscosity at 190° C. of the hot melt composition measured using a B-type viscometer was 60 Pa·s.

Subsequently, in the applying or molding step, the molten hot melt composition was injected (time required for the injection being 5 seconds) (not shown) into the glass 304 to which the primer had been applied, using a simple mold (not shown) after a period of time shown in Table 2 had passed from the application of the primer; the hot melt composition 302 was adhered to the glass 304 (the dimensions of the hot melt composition 302 being 20 mm in width, 100 mm in length, and 3 mm in thickness); and the simple mold was removed two minutes after the completion of molding, thereby obtaining a composite 300. The composite 300 was used as a sample for examining glass adhesion.

4. Glass Adhesion Test

A glass adhesion test was performed as follows. The results are shown in Table 2.

(1) Initial Adhesion

The obtained samples were subjected to a 90°-peeling test using a tensile tester.

In FIG. 3, the hot melt composition 302 was peeled from the glass 304 in the direction of an arrow 306 so as to form an angle of 90° relative to the glass 304.

The maximum tensile stress when the hot melt composition started to peel from the glass was measured. The tensile rate was 50 mm/min.

The adhesion was evaluated according to the following criteria, "Excellent": a molded body of the hot melt composition was broken at the maximum tensile stress of 100 N/20 mm or more, "Good": a molded body of the hot melt composition was not broken at the maximum tensile stress of 100 N/20 mm or more, "Poor": evaluation was impossible because the hot melt composition was detached from the glass when the sample was mounted on the tensile tester (the same applies to the following).

(2) Water-Resistant Adhesion

The obtained samples were allowed to stand in water at 20° C. for one week and pulled up, and the maximum tensile stress of each sample was measured in the same manner as the initial adhesion.

(3) Hot Water-Resistant Adhesion

The obtained samples were allowed to stand in water at 40° C. for one week and pulled up, and the maximum tensile stress of each sample was measured in the same manner as the initial adhesion.

Polyol compound: Polycarbonate diol, PLACCEL CD220 (trade name), manufactured by DAICEL CHEMICAL INDUSTRIES, LTD.;

Primer: MS-90 (manufactured by THE YOKOHAMA RUBBER CO., LTD.);

Antioxidant: Irganox 1010, manufactured by Ciba Specialty Chemicals.

As is clear from the results shown in Table 2, Comparative Example 1 (in which a polyolefin hot melt composition was used) was not adhered to glass.

Comparative Example 2 (in which a polyolefin hot melt composition was used) was not adhered to glass even when a primer was applied to the glass. The inventor of the present invention considered that this was because the adhesion between the primer and the glass was lost due to high temperatures when the polyolefin hot melt composition was used.

Comparative Examples 3 to 5 (in which a polyester hot melt composition was used but no primer was used) had poor water-resistant adhesion.

In contrast, Examples 1 to 3 showed outstanding water-resistant adhesion.

TABLE 2

|  |  | Comparative Example | | | Example | Comparative Example | Example | Comparative Example | Example |
| --- | --- | --- | --- | --- | --- | --- | --- | --- | --- |
|  |  | 1 | 2 | 3 | 3 | 4 | 1 | 5 | 2 |
| Polyolefin HM | | 100 | 100 | | | | | | |
| Polyester 1 | | | | 30 | 30 | 40 | 40 | 20 | 20 |
| Polyester 2 | | | | 20 | 20 | 30 | 30 | 30 | 30 |
| Polyester 3 | | | | 15 | 15 | 15 | 15 | 15 | 15 |
| Polyester 4 | | | | 35 | 35 | 15 | 15 | 15 | 15 |
| Polyolefin | | | | | | | | 20 | 20 |
| Tackifier | | | | | | 20 | 20 | 20 | 20 |
| Polyol compound | | | | | | 5 | 5 | 5 | 5 |
| Antioxidant | | | | 0.5 | 0.5 | 0.5 | 0.5 | 0.5 | 0.5 |
| Primer | | Non-used | Used | Non-used | Used | Non-used | Used | Non-used | Used |
| Initial adhesion | With no primer | Poor | | Good | | Good | | Good | |
| | 5 minutes after application of primer | | Poor | | Good | | Excellent | | Excellent |
| | 8 hours after application of primer | | Poor | | Good | | Excellent | | Excellent |
| | 3 days after application of primer | | Poor | | Good | | Good | | Good |
| Water-resistant adhesion | With no primer | Poor | | Poor | | Poor | | Poor | |
| | 5 minutes after application of primer | | Poor | | Good | | Excellent | | Excellent |
| | 8 hours after application of primer | | Poor | | Good | | Excellent | | Excellent |
| | 3 days after application of primer | | Poor | | Good | | Good | | Good |
| Hot water-resistant adhesion | With no primer | Poor | | Poor | | Poor | | Poor | |
| | 5 minutes after application of primer | | Poor | | Poor | | Excellent | | Excellent |
| | 8 hours after application of primer | | Poor | | Poor | | Excellent | | Excellent |
| | 3 days after application of primer | | Poor | | Poor | | Good | | Good |

Each component shown in Table 2 is as follows:

Polyolefin HM: 777, manufactured by Kaetsu Co.;

Polyesters 1 to 4: Polyesters 1 to 4 described above;

Polyolefin: Epoxy group-containing polyethylene, Bondfast 7L, manufactured by Sumitomo Chemical Co., Ltd.;

Tackifier: Rosin tackifier, PINECRYSTAL KE-6011 (trade name), manufactured by Arakawa Chemical Industries, Ltd.;

Examples 1 and 2 (in the case of a hot melt composition containing a polyol compound (c) and a tackifier (b)) showed remarkably excellent water-resistant adhesion and hot water-resistant adhesion.

5. Manufacture of Primer

Components shown in the following Table 3 were used in amounts shown in Table 3 (unit: part by weight), and the components were uniformly mixed, thereby manufacturing primers. The obtained primers were used as primers 1 to 12.

TABLE 3

| | Primer | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Silane compound 1 | 2.0 | | 2.0 | | | | | 2.0 | | | | |
| Silane compound 2 | | 2.0 | | 2.0 | | | | | 2.0 | | | |
| Silane compound 3 | | | | | 2.0 | | | | | | | |
| Silane compound 4 | | | | 0.5 | | 2.0 | | | | | | |
| Silane compound 5 | | | 0.5 | | | | 2.0 | | | | | |
| Silane compound 6 | | | | | | | | | | 2.0 | | |
| Silane compound 7 | | | | | | | | | | | 2.0 | |
| Silane compound 8 | | | | | | | | | | | | 2.0 |
| Film forming resin 1 | 1.0 | | 1.0 | | 1.0 | | | | | 1.0 | 1.0 | 1.0 |
| Film forming resin 2 | | 1.0 | | 1.0 | | | | | | | | |
| Film forming resin 3 | | 2.0 | | 1.0 | | | | | | | | |
| Film forming resin 4 | | | | | | | | 2.0 | | | | |
| Film forming resin 5 | | | | | | | | | 2.0 | | | |
| MEK | | 20 | | 20 | 20 | 20 | | | 10 | | | |
| Ethyl acetate | 40 | 20 | 40 | 20 | 20 | 20 | 40 | 20 | 10 | 40 | 40 | 40 |
| Toluene | | | | | | | | 20 | 20 | | | |
| Dibutyltin dilaurate | | | | | | 0.005 | | | | | | |
| Carbon black | | | | | | 1.0 | | | | | | |

Each component showed in Table 3 is as follows:

Silane compound 1: Reaction product of D160N (urethane prepolymer obtained from HDI and trimethylolpropane, manufactured by MITSUI CHEMICALS POLYURETHANES, INC.) and Y-9669 (3-(N-phenyl)aminopropyltrimethoxysilane, manufactured by Momentive Performance Materials Japan LLC.) at the NCO/NH ratio of 2/3, which has two silane groups in one molecule;

Silane compound 2: Reaction product of A187 (γ-glycidoxypropyltrimethoxysilane, manufactured by Momentive Performance Materials Japan LLC.) and Z-6094N (3-aminoethylaminopropyltrimethoxysilane, manufactured by Dow Corning Toray Silicone Co., Ltd.), which has three silane groups in one molecule;

Silane compound 3: Y-5187 (γ-isocyanatopropyltrimethoxysilane, manufactured by Momentive Performance Materials Japan LLC.);

Silane compound 4: Y-9669 (3-(N-phenyl)aminopropyltrimethoxysilane);

Silane compound 5: A187 (γ-glycidoxypropyltrimethoxysilane);

Silane compound 6: Reaction product of xylylene diisocyanate (manufactured by MITSUI CHEMICALS POLYURETHANES, INC.) and Y-9669, which has a silane group in one molecule;

Silane compound 7: Reaction product of xylylene diisocyanate and A-189 (γ-mercaptopropyltrimethoxysilane, manufactured by Momentive Performance Materials Japan LLC.), which has a silane group in one molecule;

Silane compound 8: Reaction product of Desmodur HL (aliphatic/aromatic isocyanurate, manufactured by Sumika Bayer Urethane Co., Ltd.) and Y9669, which has two silane groups in one molecule;

Film forming resin 1: Polyester polyurethane resin (trade name; Pandex T-5202, manufactured by DAINIPPON INK AND CHEMICALS, INCORPORATED);

Film forming resin 2: Epoxy resin (trade name: YD-017, manufactured by Tohto Kasei Co., Ltd.);

Film forming resin 3: Acrylic resin (trade name: Gemlac YC-3623, manufactured by Kaneka Corporation);

Film forming resin 4: Chlorinated PP (trade name; Superchlon HP-205, manufactured by NIPPON PAPER CHEMICALS CO., LTD.);

Film forming resin 5: Chlorinated PE (trade name: Superchlon HP-305, manufactured by NIPPON PAPER CHEMICALS CO., LTD.);

MEK: Methyl ethyl ketone.

6. Manufacture of Hot Melt Composition

Components shown in Table 4 were used in amounts shown in Table 4 (unit; part by weight), and the components were uniformly mixed using a kneader, thereby obtaining hot melt compositions. The obtained hot melt compositions were used as hot melt compositions A to G.

TABLE 4

| | Hot melt composition | | | | | | |
|---|---|---|---|---|---|---|---|
| | A | B | C | D | E | F | G |
| Olefin HM | 100 | | | | | | |
| Polyester 1 | | 30 | 40 | 20 | 20 | 20 | 20 |
| Polyester 2 | | 20 | 30 | 30 | 30 | 30 | 30 |
| Polyester 3 | | 15 | 15 | 15 | 15 | 15 | 15 |
| Polyester 4 | | 35 | 15 | 15 | 15 | 15 | 15 |
| Polyolefin 1 | | | | 20 | | | |
| Polyolefin 2 | | | | | 20 | | |
| Polyolefin 3 | | | | | | 20 | |
| Polyolefin 4 | | | | | | | 20 |
| Tackifier | | 20 | 20 | 20 | 20 | 20 | 20 |
| Polyol compound | | 5.0 | 5.0 | 5.0 | 5.0 | 5.0 | 5.0 |
| Antioxidant | 0.5 | 0.5 | 0.5 | 0.5 | 0.5 | 0.5 | 0.5 |

The components showed in Table 4 are as follows:

Olefin HM: Polyolefin hot melt composition, 777 (trade name), manufactured by Kaetsu Co.;

Polyesters 1 to 4: Polyesters 1 to 4 as shown in Table 1;

Polyolefin 1: Polypropylene (trade name: M142E, manufactured by Idemitsu Kosan Co., Ltd.);

Polyolefin 2: Low-density polyethylene (trade name: G807, manufactured by Sumitomo Chemical Co., Ltd.);

Polyolefin 3: Epoxy group-containing polyethylene, Sondfast 7L, manufactured by Sumitomo Chemical Co., Ltd.;

Polyolefin 4: Epoxy group- and maleic acid group-containing polyethylene, trade name: ADMER-SF-715, manufactured by Mitsui Chemicals, Inc.;

Tackifier: rosin tackifier, PINECRYSTAL 0-6011 (trade name), manufactured by Arakawa Chemical Industries, Ltd.;

Polyol compound: Polycarbonate diol, PLACCEL CD220 (trade name), manufactured by DAICEL CHEMICAL INDUSTRIES, LTD.;

Antioxidant: Irganox 1010, manufactured by Ciba Specialty Chemicals.

7. Manufacture of Composite

The primers 1 to 12 and the hot melt compositions A to G were used in combination as shown in Table 5, thereby manufacturing composites of glass and hot melt composition in the same manner as in the section 3. Manufacture of Sample for Glass Adhesion Test.

8. Evaluation of Composite (1) Initial Adhesion

The obtained samples were subjected to a 90°-peeling test using a tensile tester under the same conditions as in (1) Initial adhesion of the section 4. Glass Adhesion Test.

The initial adhesion was evaluated according to the following criteria, "Excellent": a molded body of the hot melt composition was broken at the maximum tensile stress of 100 N/20 mm or more, "Good": a molded body of the hot melt composition was not broken at the maximum tensile stress of 100 N/20 mm or more, and "Poor": evaluation was impossible because the hot melt composition was detached from the glass when the sample was mounted on the tensile tester (the same applies to the following).

The results are shown in Table 5.

(2) Water-Resistant Adhesion

The obtained samples were evaluated under the same conditions as in (2) Water-resistant adhesion of the section 4. Glass Adhesion Test, and the states of the samples after having been pulled up from water were visually checked.

The water-resistant adhesion was evaluated according to the following criteria, "Excellent": the adhesion strength was 100 N/20 mm or more and the hot melt layer was broken during the evaluation, making it impossible to further measure the adhesion strength, "Good": the adhesion strength was 100 N/20 mm or more and the hot melt layer was not broken during the evaluation, "Fair": the adhesion strength was 50 N/20 mm or more and peeling occurred during the evaluation; "Poor": the hot melt layer peeled from the primer layer during the evaluation, and "Poor[*1]": the primer layer peeled from the glass.

The results are shown in Table 5.

(3) Hot Water-Resistant Adhesion

The obtained samples were evaluated under the same conditions (allowed to stand in water at 40° C. for one week) as in (3) Hot water-resistant adhesion of the section 4. Glass Adhesion Test, and the maximum tensile stress of the samples after having been pulled up from hot water was determined under the same conditions as above.

The hot water-resistant adhesion was evaluated according to the following criteria, "Excellent"; the adhesion strength was 100 N/20 mm or more and the hot melt layer was broken during the evaluation, making it impossible to further measure the adhesion strength, "Good": the adhesion strength was 100 N/20 mm or more and the hot melt layer was not broken during the evaluation, "Poor": the hot melt layer peeled from the primer layer during the evaluation, and "Poor[*1]": the primer layer peeled from the glass.

The results are shown in Table 5.

TABLE 5

(No. 1)

| | Comp. Ex. 6 | Ex. 4 | Comp. Ex. 7 | Ex. 5 | Comp. Ex. 8 | Ex. 6 | Comp. Ex. 9 | Ex. 7 | Comp. Ex. 10 | Ex. 8 | Comp. Ex. 11 | Ex. 9 | Comp. Ex. 12 | Ex. 10 | Comp. Ex. 13 | Ex. 11 |
|---|---|---|---|---|---|---|---|---|---|---|---|---|---|---|---|---|
| Primer 1 | ○ | ○ | | | | | | | | | | | | | | |
| Primer 2 | | | ○ | ○ | | | | | | | | | | | | |
| Primer 3 | | | | | ○ | ○ | | | | | | | | | | |
| Primer 4 | | | | | | | ○ | ○ | | | | | | | | |
| Primer 5 | | | | | | | | | ○ | ○ | | | | | | |
| Primer 6 | | | | | | | | | | | | | | | | |
| Primer 7 | | | | | | | | | | | | | | | | |
| Primer 8 | | | | | | | | | | | | | | | | |
| Primer 9 | | | | | | | | | | | | | | | | |
| Primer 10 | | | | | | | | | | | ○ | ○ | | | | |
| Primer 11 | | | | | | | | | | | | | ○ | ○ | | |
| Primer 12 | | | | | | | | | | | | | | | ○ | ○ |
| Hot melt composition A | ○ | | ○ | | ○ | | ○ | | ○ | | ○ | | ○ | | ○ | |
| Hot melt composition B | | ○ | | ○ | | ○ | | ○ | | ○ | | ○ | | ○ | | ○ |
| Hot melt composition C | | | | | | | | | | | | | | | | |
| Hot melt composition D | | | | | | | | | | | | | | | | |
| Hot melt composition E | | | | | | | | | | | | | | | | |
| Hot melt composition F | | | | | | | | | | | | | | | | |
| Hot melt composition G | | | | | | | | | | | | | | | | |
| Initial adhesion | Poor | Good | Poor | Good | Poor | Good | Poor | Good | Poor | Good | Poor | Good | Poor | Good | Poor | Good |
| Water-resistant adhesion (20° C. × 1 W) | Poor | Good | Poor | Good | Poor | Good | Poor | Good | Poor | Good | Poor | Good | Poor | Good | Poor | Good |

TABLE 5-continued

| | | | | | | | | | | | | | | | |
|---|---|---|---|---|---|---|---|---|---|---|---|---|---|---|---|
| Hot water-resistant adhesion (40° C. × 1 W) | Poor | Poor*1 | Poor | Poor*1 | Poor | Poor*1 | Poor | Poor*1 | Poor | Poor*1 | Poor | Poor*1 | Poor | Poor*1 | Poor |

(No. 2)

| | Comparative Example | | | | Example | | | | Comparative Example | | | | | | |
|---|---|---|---|---|---|---|---|---|---|---|---|---|---|---|---|
| | 14 | 15 | 16 | 17 | 12 | 13 | 14 | 15 | 18 | 19 | 20 | 21 | 22 | 23 | 24 |
| Primer 1 | | | | | | | | | | | | | | | |
| Primer 2 | | | | | | | | | | | | | | | |
| Primer 3 | | | | | | | | | | | | | | | |
| Primer 4 | | | | | | | | | | | | | | | |
| Primer 5 | | | | | | | | | | | | | | | |
| Primer 6 | ○ | ○ | | | | | | | | | | | | | |
| Primer 7 | | | ○ | ○ | | | | | | | | | | | |
| Primer 8 | | | | | ○ | ○ | | | | | | | | | |
| Primer 9 | | | | | | | ○ | ○ | | | | | | | |
| Primer 10 | | | | | | | | | | | | | | | |
| Primer 11 | | | | | | | | | | | | | | | |
| Primer 12 | | | | | | | | | | | | | | | |
| Hot melt composition A | | | | | | | | | ○ | | | | | | |
| Hot melt composition B | | | | | | | | | | ○ | | | | | |
| Hot melt composition C | ○ | | ○ | | ○ | | ○ | | | | ○ | | | | |
| Hot melt composition D | | ○ | | ○ | | ○ | | ○ | | | | ○ | | | |
| Hot melt composition E | | | | | | | | | | | | | ○ | | |
| Hot melt composition F | | | | | | | | | | | | | | ○ | |
| Hot melt composition G | | | | | | | | | | | | | | | ○ |
| Initial adhesion | Poor | Poor | Poor | Poor | Good | Good | Good | Good | Poor | Good | Good | Good | Good | Good | Good |
| Water-resistant adhesion (20° C. × 1 W) | Poor | Poor | Poor | Poor | Fair | Fair | Fair | Fair | Poor | Poor | Poor | Poor | Poor | Poor | Poor |
| Hot water-resistant adhesion (40° C. × 1 W) | Poor | Poor | Poor | Poor | Poor | Poor | Poor | Poor | Poor | Poor | Poor | Poor | Poor | Poor | Poor |

(No. 3)

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| | — | — | — | — | — | — | — | — | — | — | — | — | — | — | — |
| Primer 1 | ○ | ○ | ○ | ○ | ○ | | | | | | | | | | |
| Primer 2 | | | | | | ○ | ○ | ○ | ○ | ○ | | | | | |
| Primer 3 | | | | | | | | | | | ○ | ○ | ○ | ○ | ○ |
| Primer 4 | | | | | | | | | | | | | | | |
| Primer 5 | | | | | | | | | | | | | | | |
| Primer 6 | | | | | | | | | | | | | | | |
| Primer 7 | | | | | | | | | | | | | | | |
| Primer 8 | | | | | | | | | | | | | | | |
| Primer 9 | | | | | | | | | | | | | | | |
| Primer 10 | | | | | | | | | | | | | | | |
| Primer 11 | | | | | | | | | | | | | | | |
| Primer 12 | | | | | | | | | | | | | | | |
| Hot melt composition A | | | | | | | | | | | | | | | |
| Hot melt composition B | ○ | | | | | ○ | | | | | ○ | | | | |
| Hot melt composition C | | ○ | | | | | ○ | | | | | ○ | | | |
| Hot melt composition D | | | ○ | | | | | ○ | | | | | ○ | | |
| Hot melt composition E | | | | ○ | | | | | ○ | | | | | ○ | |
| Hot melt composition F | | | | | ○ | | | | | ○ | | | | | ○ |
| Hot melt composition G | | | | | | | | | | | | | | | |
| Initial adhesion | Excellent | Excellent | Excellent | Excellent | Excellent | Excellent | Excellent | Excellent | Excellent | Excellent | Excellent | Excellent | Excellent | Excellent | Excellent |

TABLE 5-continued

| | | | | | | | | | | | | | | |
|---|---|---|---|---|---|---|---|---|---|---|---|---|---|---|
| Water-resistant adhesion (20° C. × 1 W) | Excellent | Excellent | Excellent | Excellent | Excellent | Excellent | Excellent | Excellent | Excellent | Excellent | Excellent | Excellent | Excellent | Excellent | Excellent |
| Hot water-resistant adhesion (40° C. × 1 W) | Excellent | Excellent | Excellent | Excellent | Excellent | Excellent | Excellent | Excellent | Excellent | Excellent | Excellent | Excellent | Excellent | Excellent | Excellent |

(No. 4)

| | Example | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Comparative Example | — | — | — | — | — | — | — | — | — | — | — | — | — | — | — |
| Primer 1 | | | | | | | | | | | | | | | |
| Primer 2 | | | | | | | | | | | | | | | |
| Primer 3 | | | | | | | | | | | | | | | |
| Primer 4 | ◯ | ◯ | ◯ | ◯ | ◯ | | | | | | | | | | |
| Primer 5 | | | | | | ◯ | ◯ | ◯ | ◯ | ◯ | | | | | |
| Primer 6 | | | | | | | | | | | | | | | |
| Primer 7 | | | | | | | | | | | | | | | |
| Primer 8 | | | | | | | | | | | | | | | |
| Primer 9 | | | | | | | | | | | | | | | |
| Primer 10 | | | | | | | | | | | ◯ | ◯ | ◯ | ◯ | ◯ |
| Primer 11 | | | | | | | | | | | | | | | |
| Primer 12 | | | | | | | | | | | | | | | |
| Hot melt composition A | | | | | | | | | | | | | | | |
| Hot melt composition B | | | | | | | | | | | | | | | |
| Hot melt composition C | ◯ | | | | | ◯ | | | | | ◯ | | | | |
| Hot melt composition D | | ◯ | | | | | ◯ | | | | | ◯ | | | |
| Hot melt composition E | | | ◯ | | | | | ◯ | | | | | ◯ | | |
| Hot melt composition F | | | | ◯ | | | | | ◯ | | | | | ◯ | |
| Hot melt composition G | | | | | ◯ | | | | | ◯ | | | | | ◯ |
| Initial adhesion | Excellent | Excellent | Excellent | Excellent | Excellent | Excellent | Excellent | Excellent | Excellent | Excellent | Excellent | Excellent | Excellent | Excellent | Excellent |
| Water-resistant adhesion (20° C. × 1 W) | Excellent | Excellent | Excellent | Excellent | Excellent | Excellent | Excellent | Excellent | Excellent | Excellent | Excellent | Excellent | Excellent | Excellent | Excellent |
| Hot water-resistant adhesion (40° C. × 1 W) | Excellent | Excellent | Excellent | Excellent | Excellent | Excellent | Excellent | Excellent | Excellent | Excellent | Excellent | Excellent | Excellent | Excellent | Excellent |

(No. 5)

| | Example | | | | | | | | | |
|---|---|---|---|---|---|---|---|---|---|---|
| | 46 | 47 | 48 | 49 | 50 | 51 | 52 | 53 | 54 | 55 |
| Comparative Example | — | — | — | — | — | — | — | — | — | — |
| Primer 1 | | | | | | | | | | |
| Primer 2 | | | | | | | | | | |
| Primer 3 | | | | | | | | | | |
| Primer 4 | | | | | | | | | | |
| Primer 5 | | | | | | | | | | |
| Primer 6 | | | | | | | | | | |
| Primer 7 | | | | | | | | | | |
| Primer 8 | | | | | | | | | | |
| Primer 9 | | | | | | | | | | |
| Primer 10 | | | | | | | | | | |
| Primer 11 | ◯ | ◯ | ◯ | ◯ | ◯ | | | | | |
| Primer 12 | | | | | | ◯ | ◯ | ◯ | ◯ | ◯ |
| Hot melt composition A | | | | | | | | | | |
| Hot melt composition B | | | | | | | | | | |
| Hot melt composition C | ◯ | | | | | ◯ | | | | |
| Hot melt composition D | | ◯ | | | | | ◯ | | | |

TABLE 5-continued

| | | | | | | | | | | |
|---|---|---|---|---|---|---|---|---|---|---|
| Hot melt composition E | | ○ | ○ | | | | ○ | ○ | | |
| Hot melt composition F | | | | ○ | | | | | ○ | |
| Hot melt composition G | | | | | | | | | | ○ |
| Initial adhesion | Excellent | Excellent | Excellent | Excellent | Excellent | Excellent | Excellent | Excellent | Excellent | Excellent |
| Water-resistant adhesion (20° C. × 1 W) | Excellent | Excellent | Excellent | Excellent | Excellent | Excellent | Excellent | Excellent | Excellent | Excellent |
| Hot water-resistant adhesion (40° C. × 1 W) | Excellent | Excellent | Excellent | Excellent | Excellent | Excellent | Excellent | Excellent | Excellent | Excellent |

As is clear from the results shown in Table 5, Examples 4 to 55 are excellent in water-resistant adhesion. Examples 16 to 55 are excellent in hot water-resistant adhesion.

Comparative Examples 6 to 13 and 18 in which polyolefin hot melt compositions were used had poor water-resistant adhesion and hot water-resistant adhesion.

Comparative Examples 14 to 17 which did not contain isocyanate silane or a reaction product of aminosilane and epoxysilane, but used silane compounds other than the isocyanate silane and the reaction product of aminosilane and epoxysilane had poor water-resistant adhesion and hot water-resistant adhesion.

Comparative Examples 18 to 24 in which no primer was used had poor water-resistant adhesion and hot water-resistant adhesion

What is claimed is:

1. A composite of glass and hot melt composition comprising:
    glass;
    a primer layer formed on the glass using a primer containing a reaction product of aminosilane and epoxysilane, and at least
    one film forming resin selected from the group consisting of a polar resin, chlorinated polypropylene and chlorinated polyethylene; and
    a hot melt layer or member formed on the primer layer using a hot melt composition containing 100 parts by weight of an aromatic polyester (a), 1 to 50 parts by weight of a tackifier (b), and 0.5 to 50 parts by weight of a polyol compound (c) having two or more hydroxy groups in one molecule.

2. The composite of glass and hot melt composition according to claim 1, wherein said polar resin is at least one selected from the group consisting of a polyurethane resin, a polyester resin, an epoxy resin and an acrylic resin.

3. The composite of glass and hot melt composition according to claim 2, wherein the hot melt composition further comprises a polyolefin (d), and the amount of the polyolefin (d) is 5 to 40 parts by weight based on 100 parts by weight of the total of said aromatic polyester (a) and the polyolefin (d).

4. The composite of glass and hot melt composition according to claim 1, wherein the hot melt composition further comprises a polyolefin (d), and the amount of the polyolefin (d) is 5 to 40 parts by weight based on 100 parts by weight of the total of said aromatic polyester (a) and the polyolefin (d).

5. The composite of glass and hot melt composition according to claim 4, wherein said polyolefin (d) has a polar group.

6. The composite of glass and hot melt composition according to claim 5, wherein the amount of said tackifier (b) is 1 to 50 parts by weight based on 100 parts by weight of the total of said aromatic polyester (a) and said polyolefin (d); and the amount of said polyol compound (c) is 0.5 to 50 parts by weight based on 100 parts by weight of the total of the aromatic polyester (a) and the polyolefin (d).

7. The composite of glass and hot melt composition according to claim 4, wherein the amount of said tackifier (b) is 1 to 50 parts by weight based on 100 parts by weight of the total of said aromatic polyester (a) and said polyolefin (d); and the amount of said polyol compound (c) is 0.5 to 50 parts by weight based on 100 parts by weight of the total of the aromatic polyester (a) and the polyolefin (d).

8. The composite of glass and hot melt composition according to claim 1, wherein said hot melt layer forms an adhesive layer.

9. The composite of glass and hot melt composition according to claim 2, wherein said hot melt layer forms an adhesive layer.

10. The composite of glass and hot melt composition according to claim 4, wherein said hot melt layer forms an adhesive layer.

11. The composite of glass and hot melt composition according to claim 5, wherein said hot melt layer forms an adhesive layer.

12. The composite of glass and hot melt composition according to claim 6, wherein said hot melt layer forms an adhesive layer.

13. The composite of glass and hot melt composition according to claim 1, wherein said member forms at least one selected from the group consisting of a glass holder, a positioning pin, and a sealing member for a junction portion of a terminal of electronic equipment.

14. The composite of glass and hot melt composition according to claim 2, wherein said member forms at least one selected from the group consisting of a glass holder, a positioning pin, and a sealing member for a junction portion of a terminal of electronic equipment.

15. The composite of glass and hot melt composition according to claim 4, wherein said member forms at least one selected from the group consisting of a glass holder, a positioning pin, and a sealing member for a junction portion of a terminal of electronic equipment.

16. The composite of glass and hot melt composition according to claim 5, wherein said member forms at least one selected from the group consisting of a glass holder, a positioning pin, and a sealing member for a junction portion of a terminal of electronic equipment.

17. The composite of glass and hot melt composition according to claim 6, wherein said member forms at least one selected from the group consisting of a glass holder, a positioning pin, and a sealing member for a junction portion of a terminal of electronic equipment.

18. The composite of glass and hot melt composition according to claim 8, wherein said member forms at least one selected from the group consisting of a glass holder, a positioning pin, and a sealing member for a junction portion of a terminal of electronic equipment.

19. A method of producing the composite of glass and hot melt composition according to claim 1, comprising: a primer applying step for applying to glass said primer;

a melting step for melting said hot melt composition; and an applying or molding step for applying or molding the molten hot melt composition onto the glass to which the primer has been applied, so as to adhere the hot melt composition to the glass to thereby obtain the composite of the glass and the hot melt composition.

20. A method of producing the composite of glass and hot melt composition according to claim 2, comprising: a primer applying step for applying to glass said primer;

a melting step for melting said hot melt composition; and an applying or molding step for applying or molding the molten hot melt composition onto the glass to which the primer has been applied, so as to adhere the hot melt composition to the glass to thereby obtain the composite of the glass and the hot melt composition.

* * * * *